United States Patent
Kotov et al.

(10) Patent No.: US 11,156,749 B2
(45) Date of Patent: Oct. 26, 2021

(54) KIRIGAMI PATTERNED POLYMERIC MATERIALS AND TUNABLE OPTIC DEVICES MADE THEREFROM

(71) Applicant: The Regents of the University of Michigan, Ann Arbor, MI (US)

(72) Inventors: Nicholas A. Kotov, Ypsilanti, MI (US); Terry Shyu, Cupertino, CA (US); Lizhi Xu, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 1418 days.

(21) Appl. No.: 15/092,885

(22) Filed: Apr. 7, 2016

(65) Prior Publication Data

US 2016/0299270 A1 Oct. 13, 2016

Related U.S. Application Data

(60) Provisional application No. 62/143,974, filed on Apr. 7, 2015.

(51) Int. Cl.
*G03F 7/36* (2006.01)
*G02B 1/04* (2006.01)
(Continued)

(52) U.S. Cl.
CPC ......... *G02B 5/1828* (2013.01); *G02B 5/1861* (2013.01); *G02B 5/1866* (2013.01)

(58) Field of Classification Search
CPC ............. G02B 5/1828; G02B 26/0808; G02B 27/0172; G02B 5/1814; G02B 5/1866;
(Continued)

(56) References Cited

U.S. PATENT DOCUMENTS 6,154,591 A 11/2000 Kershaw
7,305,160 B2 12/2007 Park et al.
(Continued)

FOREIGN PATENT DOCUMENTS

WO 2014113489 A1 7/2014
WO 2014170650 A2 10/2014

OTHER PUBLICATIONS

Blees, Melina. Graphene Kirigami, Bulletin of the American Phyiscal Society. vol. 59. No. 1. APS March Meeting (Mar. 3-7, 2014).
(Continued)

*Primary Examiner* — Collin X Beatty
*Assistant Examiner* — Grant A Gagnon
(74) *Attorney, Agent, or Firm* — Harness, Dickey & Pierce, P.L.C.

(57) ABSTRACT

The present disclosure provides a structure comprising a polymeric structure or composite material having a surface patterned via methods employing a kirigami-type technique. The patterned surface may define a first row of at least two discontinuous cuts and a second row of at least two discontinuous cuts offset from the first row. The first row and the second row cooperate to define a plurality of bridge structures therebetween, making the nanocomposite is stretchable in at least one direction. Methods of making such patterned structures via kirigami techniques, for example, via photolithography top-down cutting are also provided. Devices incorporating such kirigami-patterned polymeric structures are also provided, such as strain tunable optic devices.

22 Claims, 22 Drawing Sheets

(51) Int. Cl.
*G02B 5/18* (2006.01)
*G03F 7/20* (2006.01)

(58) Field of Classification Search
CPC .............. G02B 2027/0125; G02B 5/32; G02B 27/4272; G02B 5/1809; G02B 5/1861; G02B 27/0081; G02B 27/4205; G02B 5/1876; G02B 27/42; G02B 5/18; G02B 6/34; G02B 2027/0118; G02B 2027/0134; G02B 2027/0178; G02B 27/1086; G02B 27/48; G02B 3/0006; G02B 5/1857; G02B 6/124; G02B 6/2931; G02B 17/08; G02B 2006/0098; G02B 2027/0123; G02B 2027/014; G02B 2027/0163; G02B 2027/0174; G02B 27/0087; G02B 27/0093; G02B 27/01; G02B 27/0101; G02B 27/017; G02B 27/0176; G02B 27/0944; G02B 27/2264; G02B 27/4211; G02B 27/4216; G02B 27/4233; G02B 27/4277; G02B 27/44; G02B 3/0037; G02B 5/005; G02B 5/1819; G02B 5/1842; G02B 5/1847; G02B 5/1871; G02B 5/20; G02B 5/203; G02B 6/00; G02B 6/0035; G02B 6/02042; G02B 6/06; G02B 6/29314; G02B 6/2938; G02B 6/32; G02B 6/351; G02B 6/40; G02B 1/002; G02B 1/11; G02B 2006/12107; G02B 2027/0116; G02B 2027/0127; G02B 27/102; G02B 27/425; G02B 3/0087; G02B 3/08; G02B 5/008; G02B 5/0263; G02B 5/1895; G02B 6/0016; G02B 6/005; G02B 6/29395; G02B 19/0014; G02B 19/0057; G02B 2027/0107; G02B 2027/0112; G02B 2027/015; G02B 2027/0154; G02B 2027/0161; G02B 21/32; G02B 23/00; G02B 26/005; G02B 26/02; G02B 26/0841; G02B 26/085; G02B 26/0858; G02B 26/0866; G02B 26/0891; G02B 26/108; G02B 27/0025; G02B 27/0031; G02B 27/0037; G02B 27/005; G02B 27/0103; G02B 27/0149; G02B 27/022; G02B 27/0927; G02B 27/0933; G02B 27/0955; G02B 27/10; G02B 27/106; G02B 27/28; G02B 27/286; G02B 27/4238; G02B 27/4244; G02B 27/4255; G02B 27/4261; G02B 27/4294; G02B 5/02; G02B 5/0226; G02B 5/0242; G02B 5/0252; G02B 5/0268; G02B 5/0294; G02B 5/045; G02B 5/1823; G02B 5/188; G02B 5/30; G02B 5/3025; G02B 5/3066; G02B 5/3083; G02B 6/0018; G02B 6/0023; G02B 6/0031; G02B 6/0053; G02B 6/0055; G02B 6/0056; G02B 6/0058; G02B 6/02138; G02B 6/12007; G02B 6/12009; G02B 6/1203; G02B 6/1223; G02B 6/1225; G02B 6/29304; G02B 6/29307; G02B 6/29308; G02B 6/29311; G02B 6/29313; G02B 6/2932; G02B 6/29322; G02B 6/29325; G02B 6/3534; G02B 6/3548; G02B 6/3572; G02B 6/4246; G02B 7/08; G06T 13/40; G06T 15/10; G06T 15/506; G06T 19/006; G06T 19/20; G06T 2207/10021; G06T 2207/30201; G06T 2213/08; G06T 5/003; G06T 7/73; H04N 13/117; H04N 13/239; H04N 13/286; H04N 13/341; H04N 13/344; H04N 13/361; H04N 13/363; H04N 13/366; H04N 13/383; H04N 2013/0085; H04N 5/21; H04N 5/225; H04N 5/74; H04N 9/3152; H04N 9/3164; H04N 5/33; H04N 9/3161; H01L 2227/323; H01L 2251/5338; H01L 27/2463; H01L 27/3244; H01L 31/02008; H01L 31/02167; H01L 31/022425; H01L 31/022441; H01L 31/022458; H01L 31/02363; H01L 31/02366; H01L 31/028; H01L 31/035272; H01L 31/035281; H01L 31/03682; H01L 31/068; H01L 31/0682; H01L 31/0745; H01L 31/0747; H01L 31/18; H01L 31/1804; H01L 31/182; H01L 45/08; H01L 45/1233; H01L 45/1273; H01L 45/145; H01L 45/146; H01L 45/16; H01L 45/1608; H01L 45/1675; H01L 51/003; H01L 51/0097; H01L 51/56
USPC ........................................................ 359/573
See application file for complete search history.

(56) References Cited

U.S. PATENT DOCUMENTS

| 9,289,132 | B2 * | 3/2016 | Ghaffari ............. A61B 1/00082 |
| 2013/0320273 | A1 * | 12/2013 | Kotov ....................... A61N 1/05 |
| | | | 252/511 |
| 2014/0249526 | A1 | 9/2014 | Kotov et al. |
| 2016/0285410 | A1 | 9/2016 | Forrest et al. |

OTHER PUBLICATIONS

Andres, Christine M. et al., Shape-Morphing Nanocomposite Origami. Langmuir. vol. 30. pp. 5378-5385. (2014).
Kotov Nicholas, et al. NSF EFRI ODISSEI: Multi-scale Origami for Novel Photonics, Energy Conversion ODISSEI Theme 2: Active Materials. FIU-EFRI-ODISSEI Workshop. (Jan. 24, 2014).
Cofield, Calia. Graphene, Paper, Scissors. APS News. vol. 23. No. 4. (Apr. 2014).
Song, Z.; Wang, X.; Lv, C.; An, Y.; Liang, M.; Ma, T.; He, D.; Zheng, Y.-J.; Huang, S.-Q.; Yu, H.; et al. Kirigami-Based Stretchable Lithium-Ion Batteries. Sci. Rep. 2015, 5, 10988.
Zhang, Y.; Yan, Z.; Nan, K; Xiao, D.; Liu, Y.; Luan, H.; Fu, H.; Wang, X.; Yang, Q.; Wang, J.; et al. A Mechanically Driven Form of Kirigami as a Route to 3D Mesostructures in Micro/nanomembranes. Proc. Natl. Acad. Sci. 2015, 112, 11757.
Shyu, T. C.; Damasceno, P. F.; Dodd, P. M.; Lamoureux, A.; Xu, L.; Shlian, M.; Shtein, M.; Glotzer, S. C.; Kotov, N. A. A Kirigami Approach to Engineering Elasticity in Nanocomposites through Patterned Defects. Nat. Mater. 2015, 14, 785-789.
Blees, M. K.; Barnard, A. W.; Rose, P. A.; Roberts, S. P.; McGill, K. L.; Huang, P. Y.; Ruyack, A. R.; Kevek, J. W.; Kobrin, B.; Muller, D. A.; et al. Graphene Kirigami. Nature 2015, 524, 204.
Cho, Y.; Shin, J.-H.; Costa, A.; Kim, T. A.; Kunin, V.; Li, J.; Lee, S. Y.; Yang, S.; Han, H. N.; Choi, I.-S.; et al. Engineering the Shape and Structure of Materials by Fractal Cut. Proc. Natl. Acad. Sci. U. S. A. 2014, 111, 17390-17395.
Gracias, D. H.; Kavthekar, V.; Love, J. C.; Paul, K. E.; Whitesides, G. M. Fabrication of Micrometer-Scale, Patterned Polyhedra by Self-Assembly. Adv. Mater. 2002, 14, 235-238.
Saito, K.; Agnese, F.; Scarpa, F. A Cellular Kirigami Morphing Wingbox Concept. J. Intell. Mater. Syst. Struct. 2011, 22, 935-944.
Tang, Z.; Kotov, N. A.; Magonov, S.; Ozturk, B. Nanostructured Artificial Nacre. Nat. Mater. 2003, 2, 413-418.

(56) References Cited

OTHER PUBLICATIONS

Hawkes, E.; An, B.; Benbernou, N. M.; Tanaka, H.; Kim, S.; Demaine, E. D.; Rus, D.; Wood, R. J. Programmable Matter by Folding. Proc. Natl. Acad. Sci. U. S. A. 2010, 107, 12441-12445.

Overvelde, J. T. B.; Shan, S.; Bertoldi, K Compaction through Buckling in 2D Periodic, Soft and Porous Structures: Effect of Pore Shape. Adv. Mater. 2012, 24, 2337-2342.

Zhang Y.; Matsumoto, E. A.; Peter, A.; Lin, P. C.; Kamien, R. D.; Yang, S. One-Step Nanoscale Assembly of Complex Structures via Harnessing of an Elastic Instability. Nano Lett 2008, 8, 1192-1196.

Qi, Z.; Campbell, D. K.; Park, H. S. Atomistic Simulations of Tension-Induced Large Deformation and Stretchability in Graphene Kirigami. Phys. Rev. B 2014, 90, 245437.

Mamedov, A. A; Kotov, N. a; Prato, M.; Guldi, D. M.; Wicksted, J. P.; Hirsch, A. Molecular Design of Strong Single-Wall Carbon Nanotube/polyelectrolyte Multilayer Composites. Nat. Mater. 2002, 1, 190-194.

Podsiadlo, P.; Kaushik, A. K.; Arruda, E. M.; Waas, A. M.; Shim, B. S.; Xu, J.; Nandivada, H.; Pumplin, B. G.; Lahann, J.; Ramamoorthy, A.; et al. Ultrastrong and Stiff Layered Polymer Nanocomposites. Science. 2007, 318, 80-83.

Shih, C. Y.; Harder, T. A.; Tai, Y. C. Yield Strength of Thin-Film Parylene-C. Microsyst. Technol. 2004, 10, 407-411.

Lipomi, D. J.; Vosgueritchian, M.; Tee, B. C.-K.; Hellstrom, S. L; Lee, J. A.; Fox, C. H.; Bao, Z. Skin-like Pressure and Strain Sensors Based on Transparent Elastic Films of Carbon Nanotubes. Nat. Nanotechnol. 2011, 6, 788-792.

Someya, T.; Kato, Y.; Sekitani, T.; Iba, S.; Noguchi, Y.; Murase, Y.; Kawaguchi, H.; Sakurai, T. Conformable, Flexible, Large-Area Networks of Pressure and Thermal Sensors with Organic Transistor Active Matrixes. Proc. Natl. Acad. Sci. U. S. A. 2005, 102, 12321-12325.

Ahn, B. Y.; Shoji, D.; Hansen, C. J.; Hong, E; Dunand, D. C.; Lewis, J. A. Printed Origami Structures. Adv. Mater. 2010, 22, 2251-2254.

Lamoureux, A.; Lee, K.; Shlian, M.; Forrest, S. R.; Shtein, M. Dynamic Kirigami Structures for Integrated Solar Tracking. Nat. Commun. 2015, 6, 8092.

Shim, B. S.; Tang, Z.; Morabito, M. P.; Agarwal, A.; Hong, H.; Kotov, N. A. Integration of Conductivity, Transparency, and Mechanical Strength into Highly Homogeneous Layer-by-Layer Composites of Single-Walled Carbon Nanotubes for Optoelectronics. Chem. Mater. 2007, 19, 5467-5474.

Shim, B. S.; Zhu, J.; Jan, E.; Critchley, K.; Kotov, N. A. Transparent Conductors from Layer-by-Layer Assembled SWNT Films: Importance of Mechanical Properties and a New Figure of Merit. ACS Nano 2010, 4, 3725-3734.

* cited by examiner

KIRIGAMI PATTERNED POLYMERIC MATERIALS AND TUNABLE OPTIC DEVICES MADE THEREFROM

CROSS REFERENCE TO RELATED APPLICATIONS

This application claims the benefit of U.S. Provisional Application No. 62/143,974 filed on Apr. 7, 2015. The entire disclosure of the above application is incorporated herein by reference.

GOVERNMENT RIGHTS

This invention is made with government support under EFRI1240264 awarded by the National Science Foundation. The Government has certain rights in the invention.

FIELD

The present disclosure relates to flexible multifunctional polymeric or nanocomposite structures having a plurality of cuts formed via a kirigami style technique, methods for making the same, and tunable adaptive optic devices formed therefrom.

BACKGROUND

This section provides background information related to the present disclosure which is not necessarily prior art.

Multifunctional nanocomposites capable of sustaining high strains have received widespread attention for next-generation load bearing elements, actuators, batteries and biomedical implants. Research efforts to impart the elasticity and multifunctionality of nanocomposites have focused primarily on incorporating polymeric and nanoscale components. However, such composites often possess unpredictable strain-property relationships, owing to the stochastic appearance of strain-concentrating defects and the stiffening of nanoscale components at high strains.

Strain engineering has become increasingly important for the next generation of nano composites, enabling a combination of mechanical and electrical properties typically unattainable in traditional metals, ceramics, and polymers. There is a great need to further expand the range of accessible strain states and develop new ways to deterministically control relationships between strain and physical properties of materials. Typically, it is desirable to retain functional properties under high strains, but such relationships for elastic nanocomposites are hard to predict due to the complexity of deformation and failure mechanisms.

Stress failure of stiff and brittle materials strongly depends on stochastically-distributed nanoscale and microscale defects, which serve as stress concentrators that promote propagation of microcracks, leading to failure. Many natural and engineered nanocomposites combine hard and soft components that can arrest the propagation of microcracks, but their ultimate strains do not exceed 5% at high loading of the stiff components. On the other hand, while random stress concentrations can be avoided in highly elastic nanocomposites and strains as high as 470% can be reached, but at the expense of the functional properties, such as electrical conductivity. Interfacial stiffening of polymer chains at interfaces with nanoscale components severely limits the macroscale elasticity of composites, as well as their ability to relax local strain singularities. Strain-induced restructuring in several interdependent components adds to the complexity of the multiscale deformations in nanocomposites, and severely complicates predictive modeling of their tensile behavior. Thus, it would be desirable to provide multifunctional flexible nanocomposite and polymeric structures that also have high strain levels.

SUMMARY

This section provides a general summary of the disclosure, and is not a comprehensive disclosure of its full scope or all of its features.

In certain aspects, the present disclosure provides a structure comprising a polymeric sheet or film having a specially patterned surface. In certain aspects, the composite is a nanocomposite comprising a polymer and a reinforcement nanomaterial distributed therein. The nanocomposite may have a patterned surface defining first row of at least two discontinuous cuts and a second row of at least two discontinuous cuts offset from the first row. The first row and the second row cooperate to define a plurality of bridge structures therebetween. The nanocomposite is stretchable in at least one direction and has advantageously high ultimate tensile strains after the patterned surface is formed therein.

In other aspects, the present disclosure provides a tunable optic device that comprises a tunable optic grating capable of transmitting or reflecting light. The tunable optic grating comprises a stretchable polymeric structure having a patterned surface defining a first row of at least two discontinuous cuts and a second row of at least two discontinuous cuts offset from the first row. The first row and the second row cooperate to define a plurality of bridge structures therebetween. A tensioning component is attached to the tunable polymeric structure that reversibly stretches the stretchable polymeric structure in at least one direction, thereby modifying the light as it is transmitted through the stretchable polymeric structure in the tunable optic grating.

In other aspects, a photolithographic method of making a pattern on a polymeric sheet or film, such as a nanocomposite, having a kirigami patterned surface is provided. The method may comprise disposing the nanocomposite on a substrate. The nanocomposite comprises a polymer and a reinforcement nanomaterial distributed therein. Then, a photoresist material is applied to the nanocomposite and can be treated to form a pattern of openings in the photoresist material by exposing it to a source of light or other energy. Then, the nanocomposite is etched through the openings in the photoresist material. The etching thus creates a pattern in the nanocomposite defining a first row comprising at least two discontinuous cuts and a second row comprising at least two discontinuous cuts offset from the first row, where the first row and the second row cooperate to define a plurality of bridge structures therebetween. After the etching to form the pattern, the nanocomposite is stretchable in at least one direction. The specialized patterns can be applied to composite sheets or films by precision cuts in micro- meso-, nano- and/or macroscales.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3A:
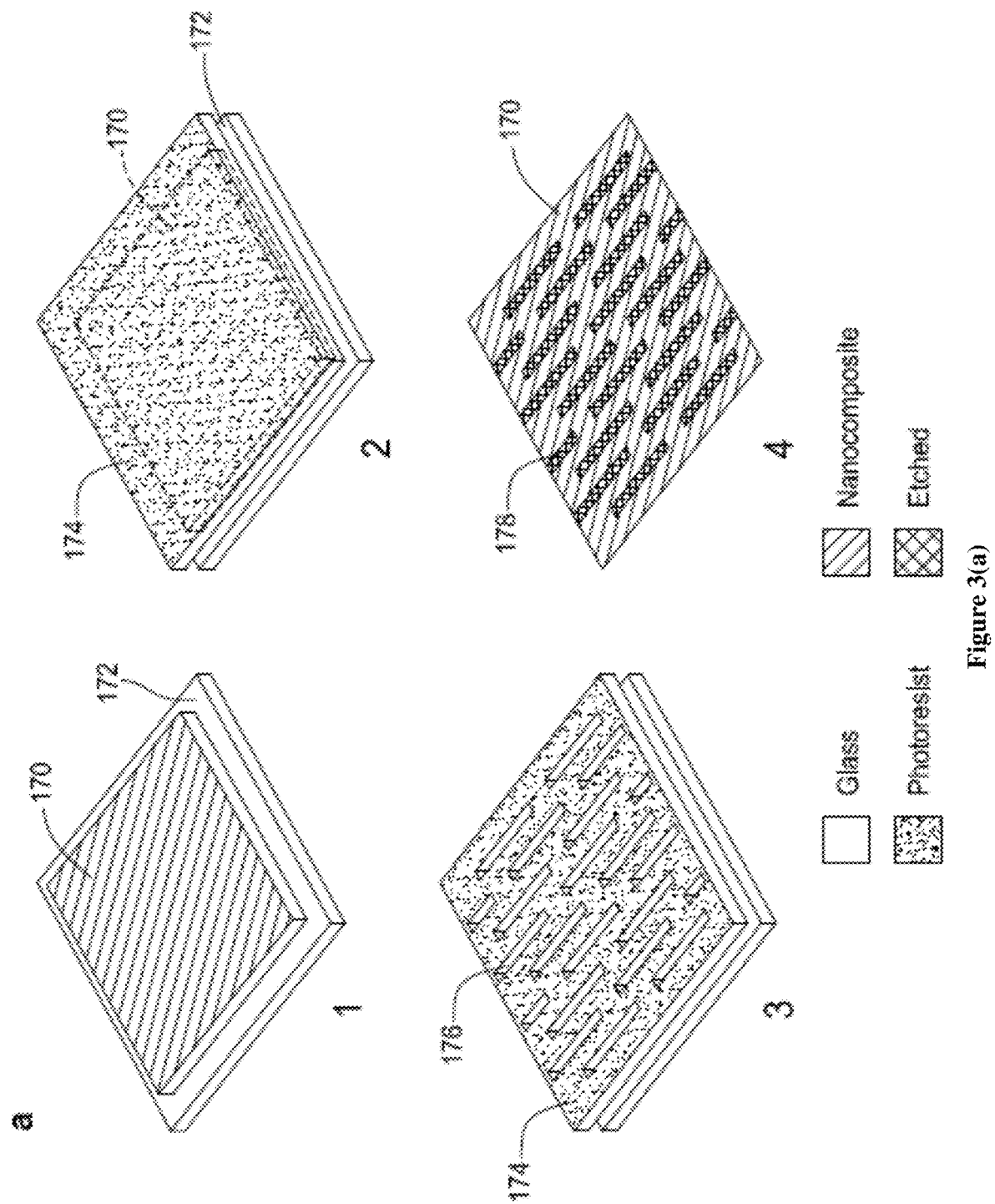
Figures 3B, 3C, 3D:
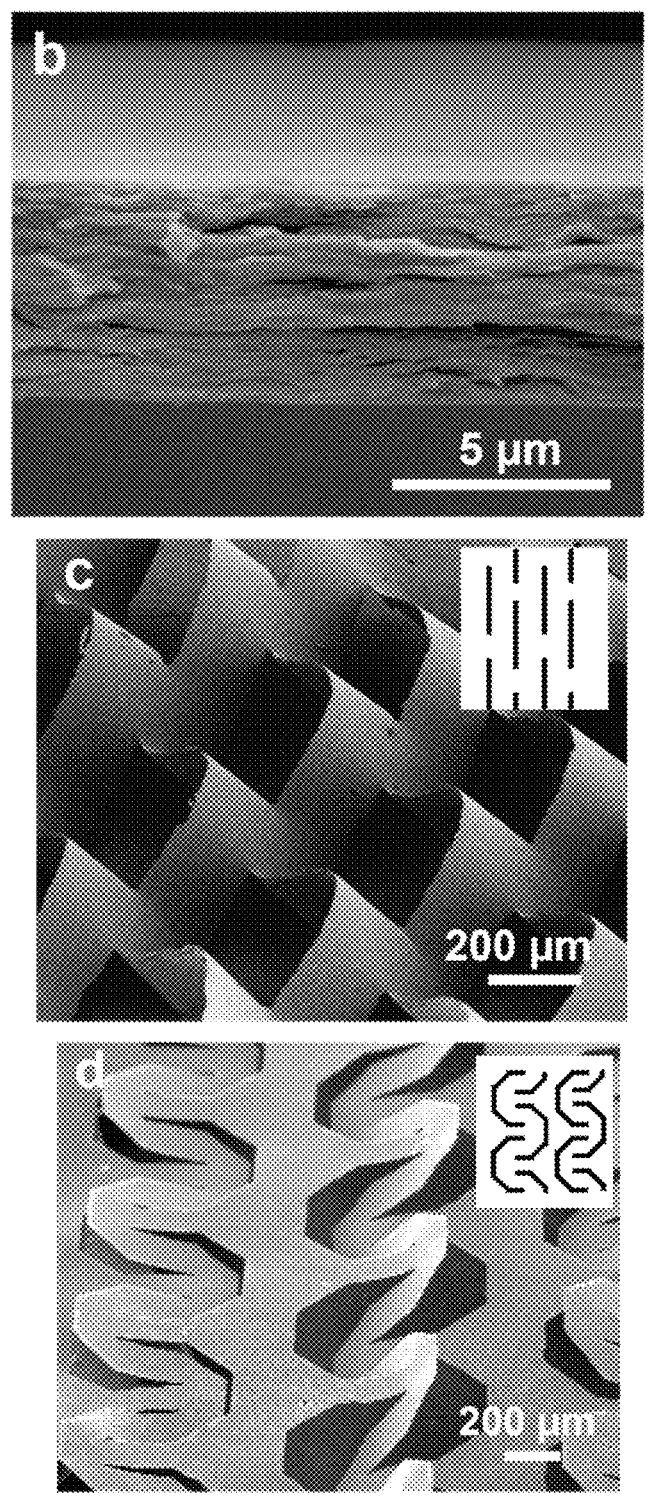

FIGS. 3(a)-3(d): microscale kirigami patterns in accordance with certain aspects of the present disclosure. FIG. 3(a) is a schematic of the kirigami microfabrication process. In FIG. 3(a), (1) is a nanocomposite deposited on a solid substrate for patterning; (2) is a photoresist deposited and developed; (3) is an oxygen plasma etched through the nanocomposite that creates kirigami patterns; (4) is the nanocomposite sheet detached from the substrate. In FIG. 3(b), scanning electron microscopy of the cross-section of a GO-PVA nanocomposite is shown. In FIGS. 3(c)-3(d), two examples of microscale kirigami patterns in GO-PVA nanocomposites after photolithography are shown. The insets show the corresponding kirigami unit cells.

Figure 4:
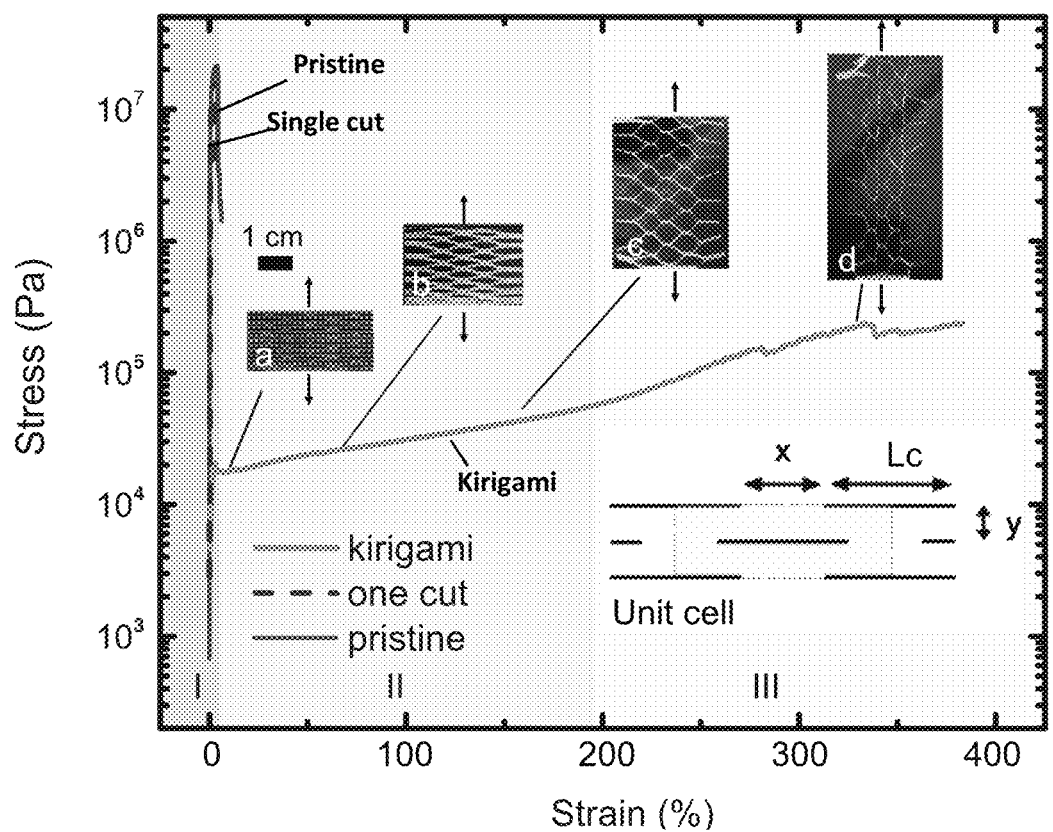

FIG. 4 shows stress-strain curves for a model macroscale kirigami sheet (green), a non-patterned sheet (gray curve), and a sheet with a single notch in the middle (dashed blue). Sections (I), (II), and (III) represent the regions of initial elastic deformation, secondary elastic deformation with buckling, and pattern collapse, respectively shown at points (a)-(d) in the kirigami sheet curve ((a)-(d) are scanning electron microscopy images of the deformed kirigami pattern in different regions of the strain-stress curve). The inset shows a schematic of a cut pattern unit cell marked in yellow. Cuts are indicated by the black horizontal lines. The sheets are made on paper using CAD-programmed computerized cutter.

Figures 5A, 5B:
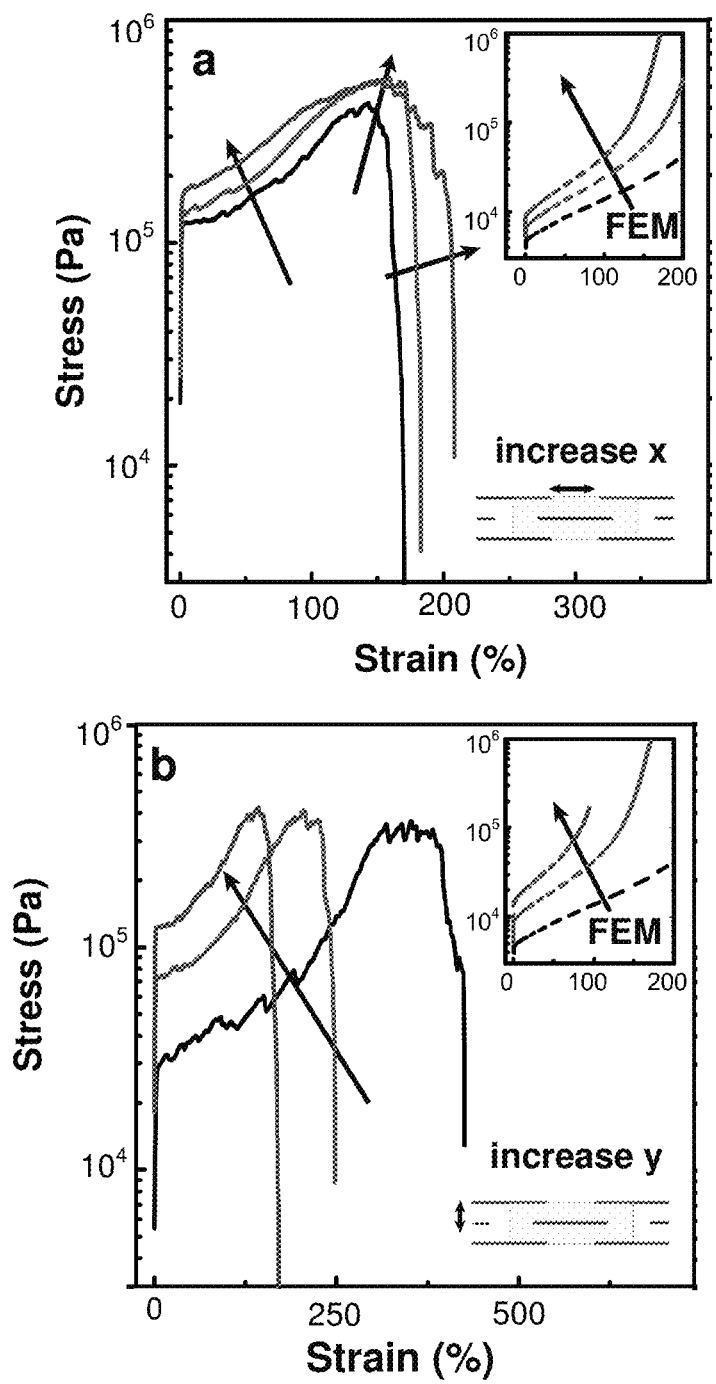
Figure 5C:
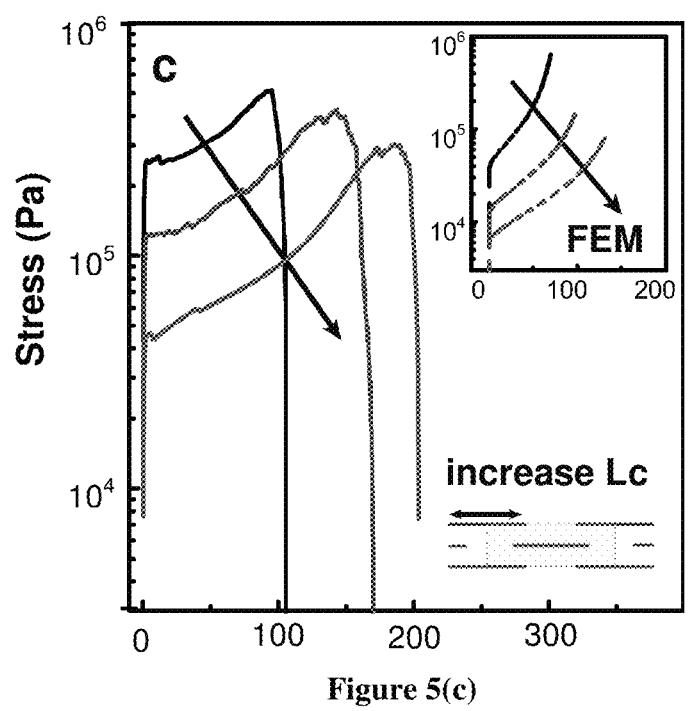

FIGS. 5(a)-5(c): experimental and finite element methods (FEM) calculated (insets) of stress-strain curves for macroscale kirigami sheets with variable unit cell parameters prepared in accordance with certain aspects of the present disclosure. FIG. 5(a) shows horizontal separation x between the cuts, FIG. 5(b) shows vertical separation y between the cuts, and FIG. 5(c) shows cut length $L_C$.

Figures 6A, 6B, 6C, 6D, 6E, 6F, 6G:
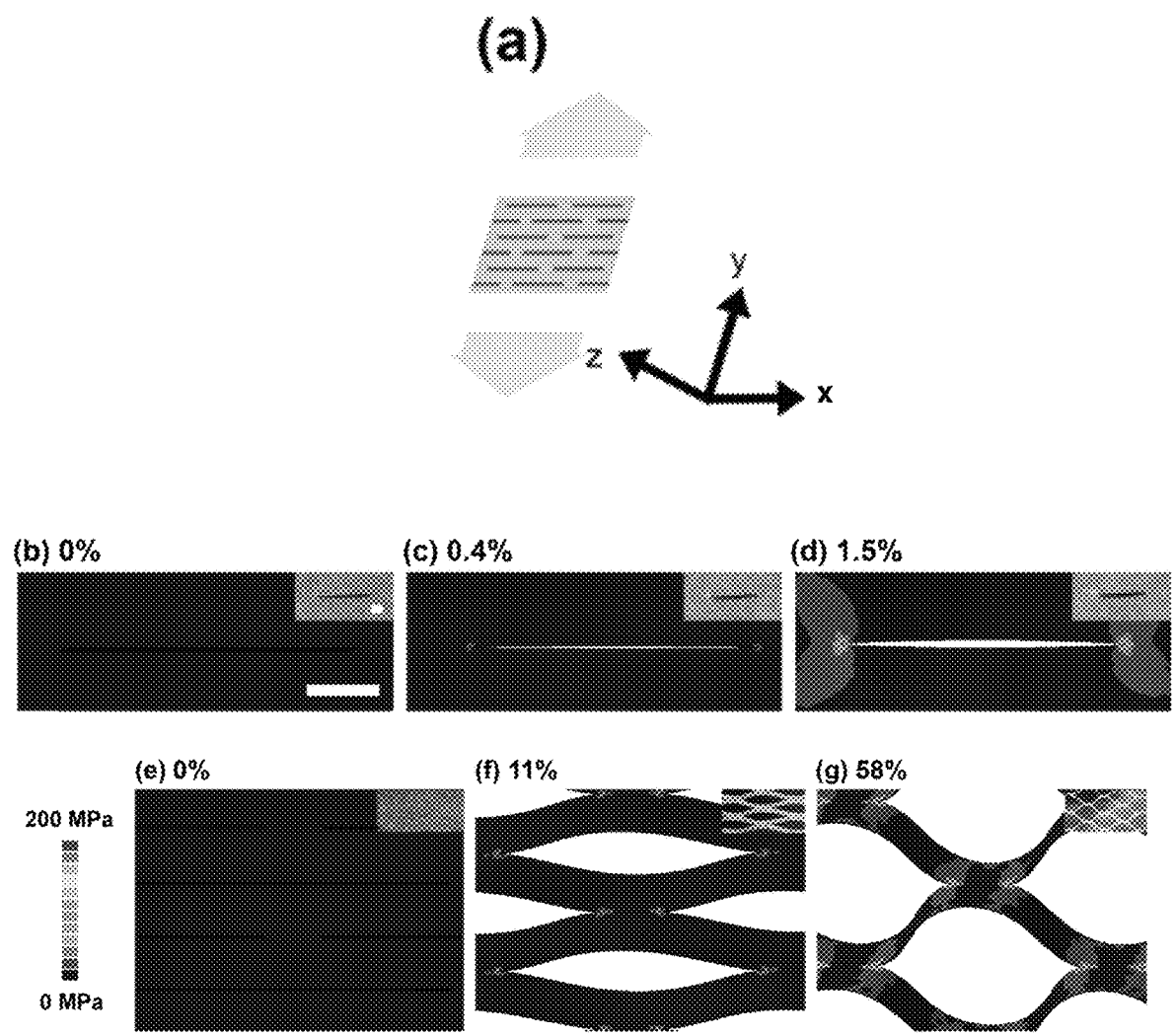

FIGS. 6(a)-6(g): stress concentration visualization in FEM for kirigami cut sheets prepared in accordance with certain aspects of the present disclosure. FIG. 6(a) is a schematic of loading direction with respect to the unit cell. FIGS. 6(b)-6(d) are FEM snapshots showing stress distribution of a sheet containing a single cut at each strain level of 0% (FIG. 6(b)), 0.4% (FIG. 6(c)), and 1.5% (FIG. 6(d)). FIGS. 6(e)-6(g) show stress distribution of periodic kirigami cut at different strain levels of 0% (FIG. 6(e)), 11% (FIG. 6(f)), and 58% (FIG. 6(g)). Insets show the corresponding samples. Scale bar: 2 mm.

Figures 7A, 7B, 7C, 7D:
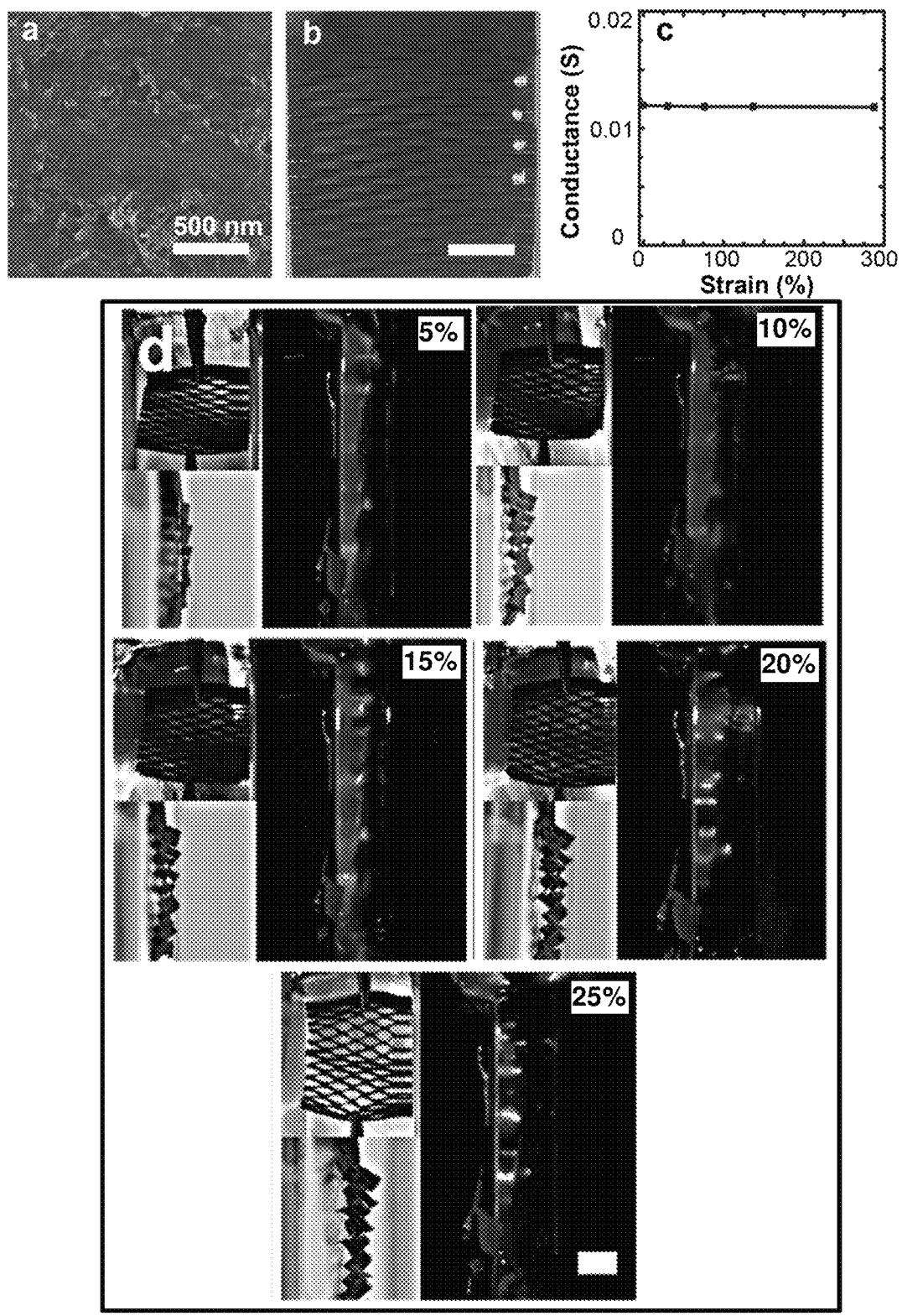

FIGS. 7(a)-7(d): conducting kirigami nanocomposites prepared in accordance with certain aspects of the present disclosure. FIG. 7(a) shows a scanning electron micrograph of a carbon nanotube (CNT) nanocomposite sheet made by infiltrating paper with CNTs shown in FIG. 7(b) to yield a uniform conducting sheet, followed by kirigami patterning. FIG. 7(c) shows conductance versus strain behavior up to approximately 300% strain. FIG. 7(d) shows plasma patterns generated on a kirigami electrode at varying strains: 5%, 10%, 15%, 20%, and 25%; insets show front and side views. Scale bars in FIGS. 7(b) and 7(d) are 1 cm.

Figures 8A, 8B, 8C:
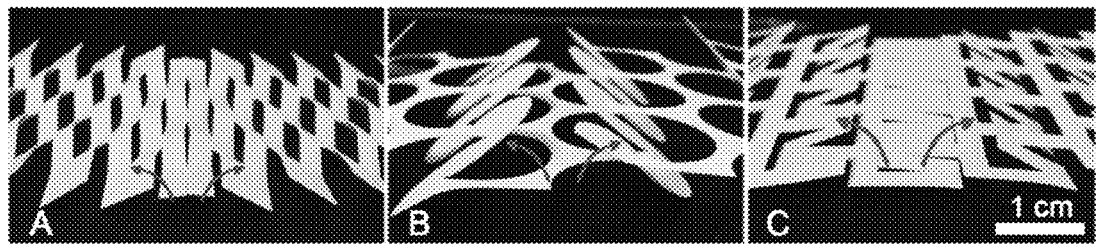

FIGS. 8(a)-8(c): kirigami nanocomposites having different cut patterns under tension prepared in accordance with certain aspects of the present disclosure. FIG. 8(a) shows a linear kirigami cut pattern. FIG. 8(b) shows a circular kirigami cut pattern. FIG. 8(c) shows a square kirigami cut pattern.

Figures 9A, 9B, 9C:
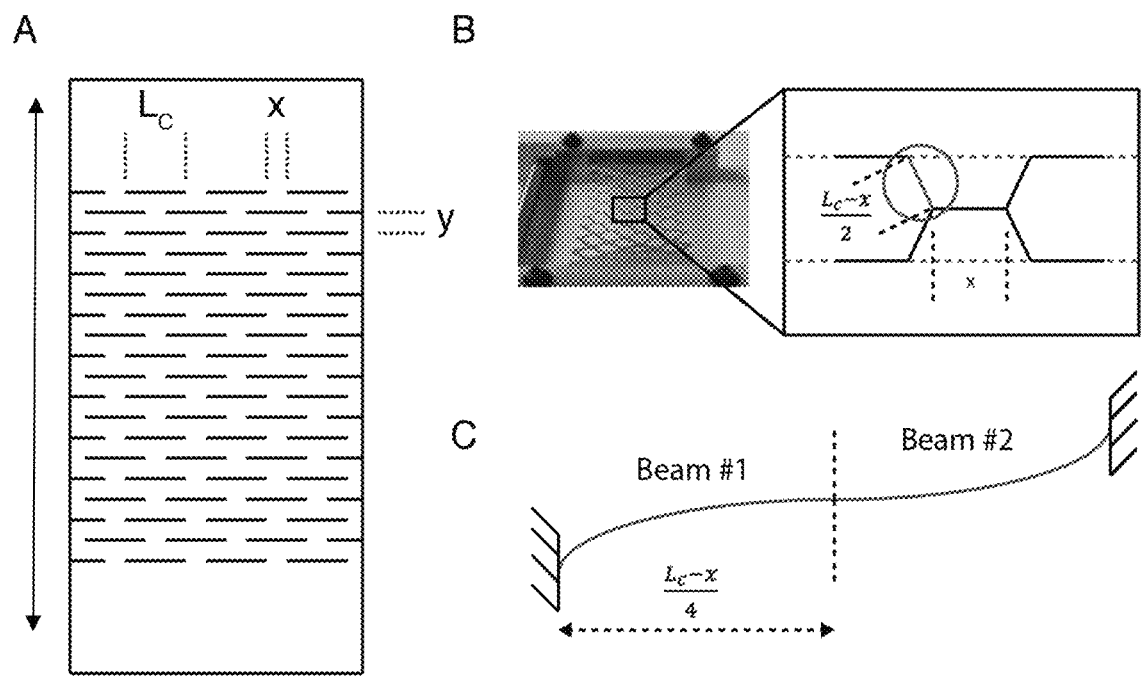

FIGS. 9(a)-9(c): force analysis using beam theory. FIG. 9(a) shows a schematic of kirigami linear cut geometry. FIG. 9(b) shows a close-up of the approximated beams, made up of two smaller, joined beams. FIG. 9(c) shows each with a length of $L_c-x/4$.

Figure 10A:
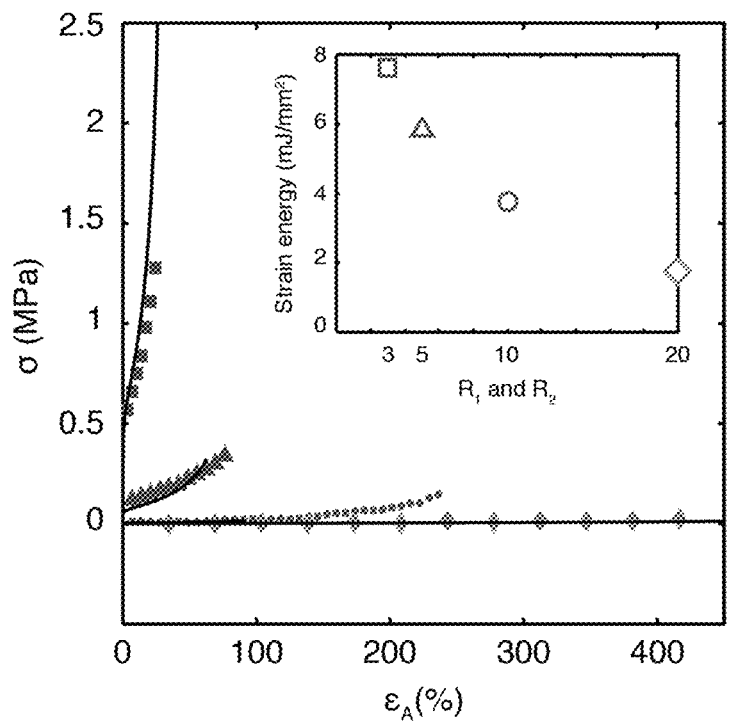
Figure 10B:
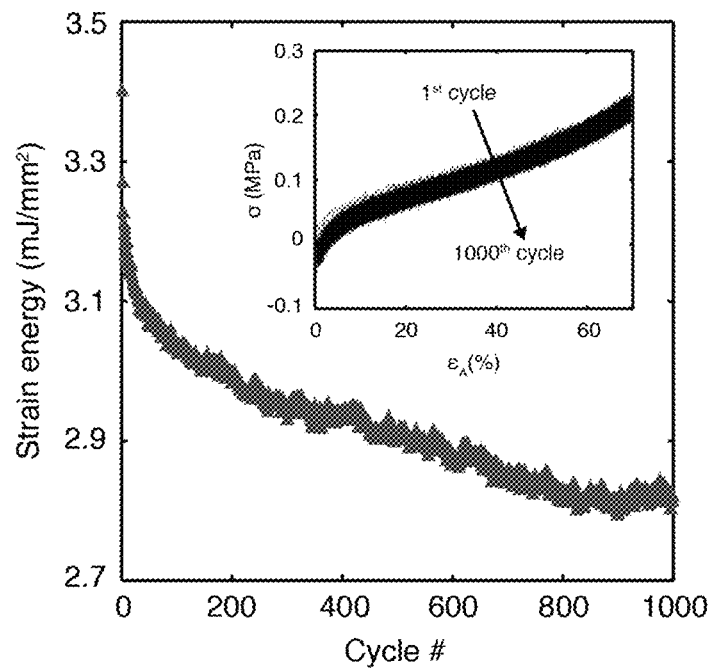

FIGS. 10(a)-10(b): mechanical properties of a kirigami cut polymeric polyimide film prepared in accordance with certain aspects of the present disclosure. FIG. 10(a) shows stress (σ) versus axial strain (εA) of kirigami patterns made in polyimide films (DuPont KAPTON® polyimide film) with FEM fit to the data shown in the black curves. FIG. 10(b) shows mechanical cycling of 1000 cycles from 0% to 70% strain, showing the strain energy fade of 15% after 1000 cycles.

Figure 11:
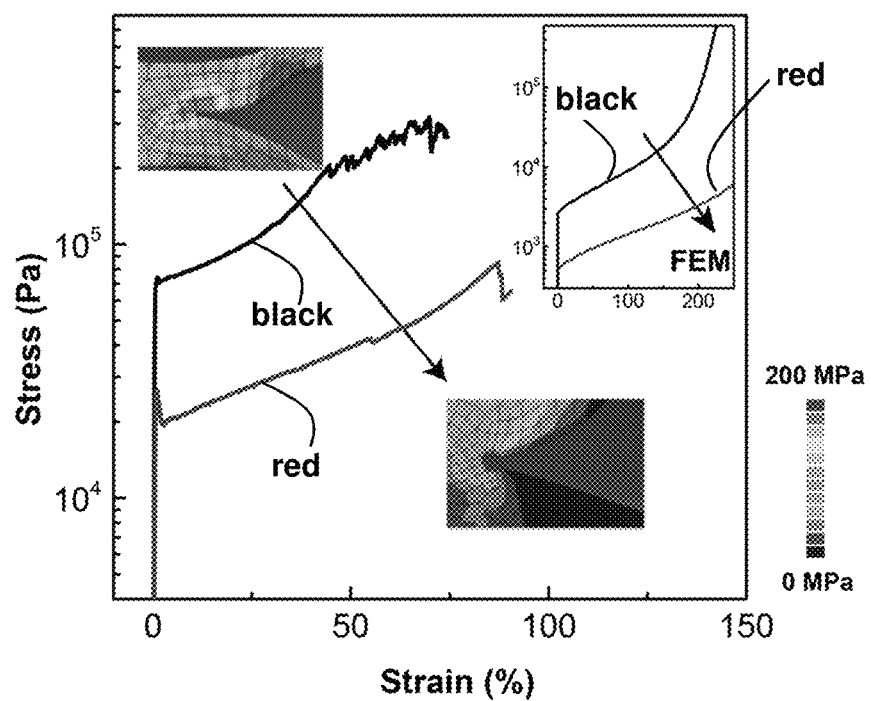

FIG. 11 is a stress versus axial strain where a cut edge is blunted in the form of a circle at the intersection of the cuts, which can further distribute the stress at each cut edge in accordance with certain aspects of the present disclosure. The plot shows a sample with (red) and without (black) the stress distributing geometry. The effective stress at the crack tip decreases, as seen in the FEM insets.

Figure 12:
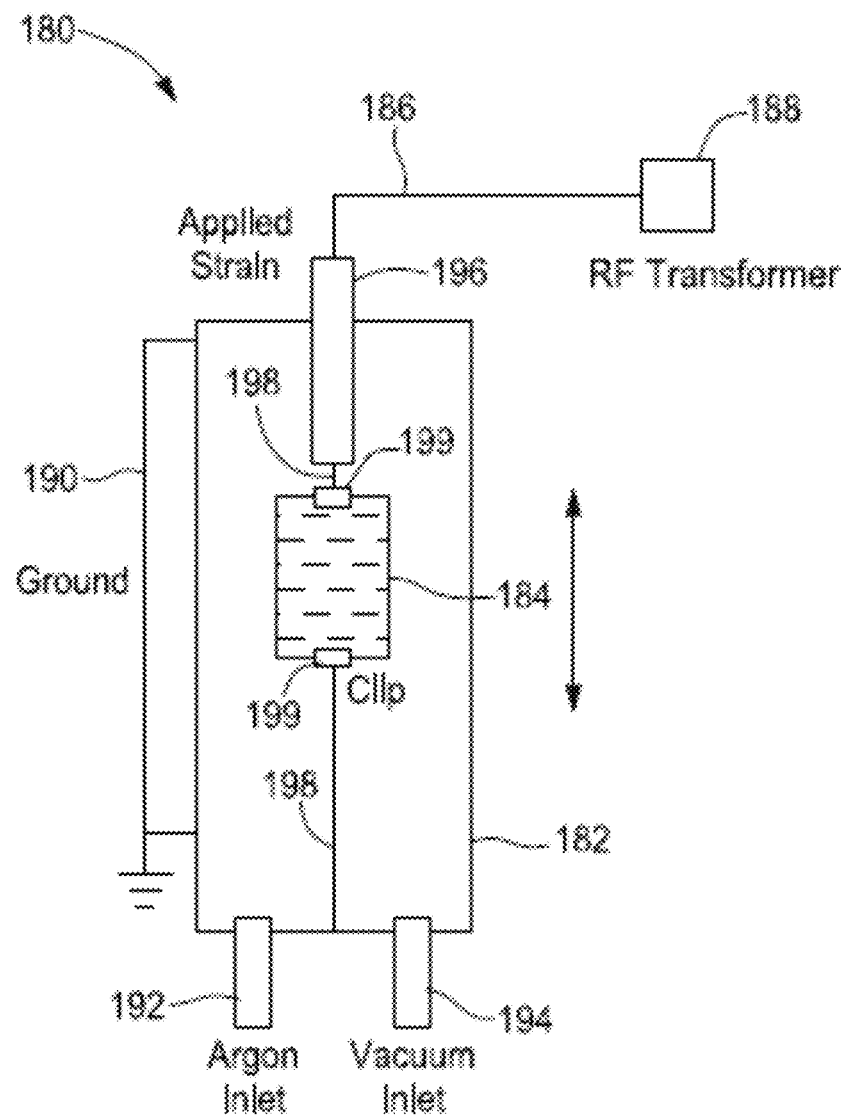

FIG. 12 shows a schematic of a custom-made plasma chamber incorporating a polymeric stretchable electrode prepared in accordance with certain aspects of the present disclosure.

Figure 13:
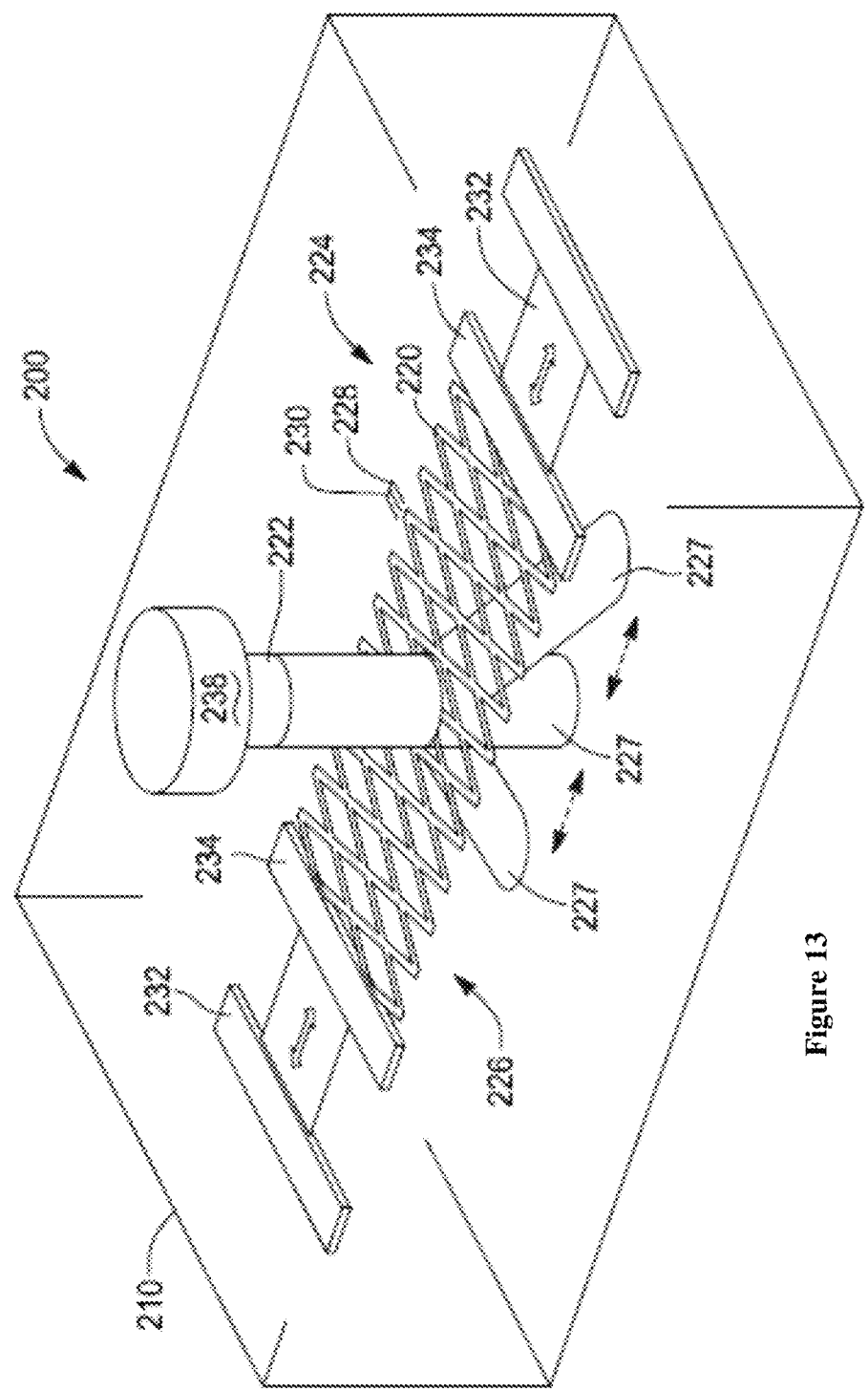

FIG. 13 shows a simplified schematic of an exemplary tunable optic device comprising a stretchable tunable optic grating structure prepared in accordance with certain aspects of the present disclosure.

Figure 14:
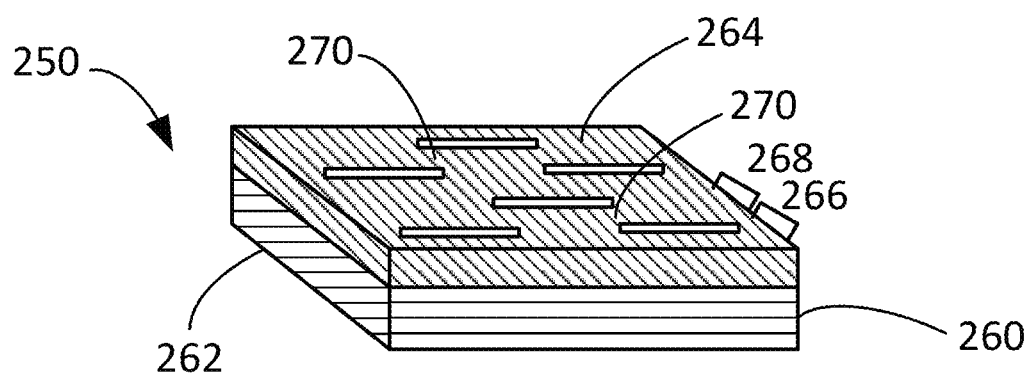

FIG. 14 shows a schematic of a kirigami cut multilayered polymeric stretchable tunable optic grating structure prepared in accordance with certain aspects of the present disclosure for use in a tunable optic device.

Figure 15:
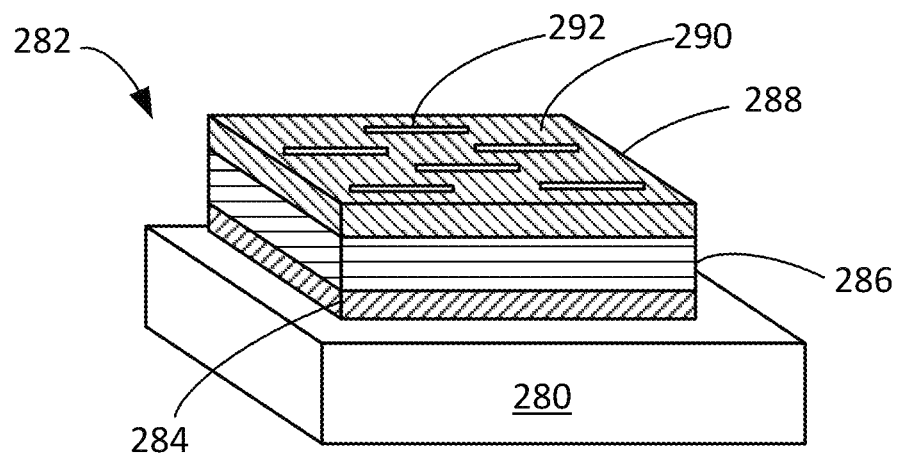

FIG. 15 shows another schematic of a kirigami cut multilayered polymeric stretchable tunable optic grating structure prepared on a substrate and having a sacrificial release layer formed via a layer-by-layer process in accordance with certain aspects of the present disclosure for use in a tunable optic device.

Figure 16:
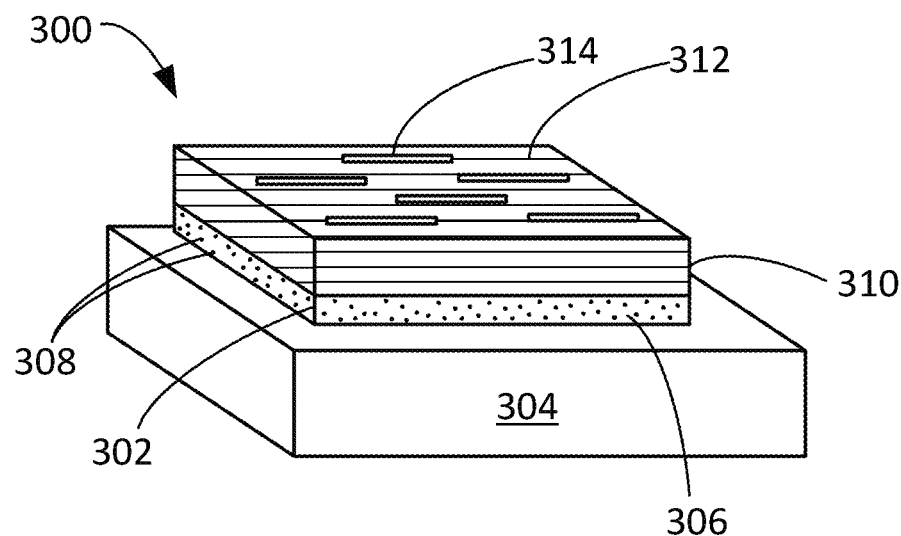

FIG. 16 shows another schematic of a kirigami cut multilayered polymeric stretchable tunable optic grating structure prepared on a substrate and having a nanocomposite layer formed via a layer-by-layer process in accordance with certain aspects of the present disclosure for use in a tunable optic device.

Figure 17:
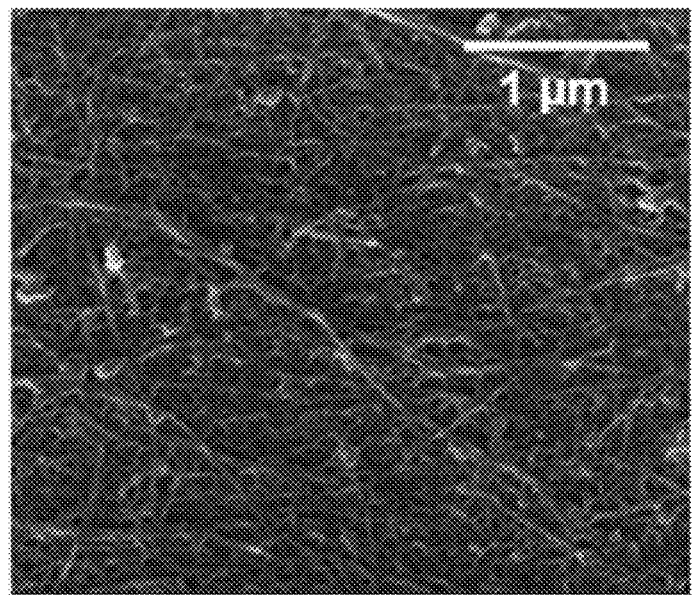

FIG. 17 shows a scanning electron microscope (SEM) image of the surface of a CNT/PVA composite formed on top of a parylene C thin film in a multilayered polymeric structure prepared via a layer-by-layer process in accordance with certain aspects of the present disclosure.

Figure 18:
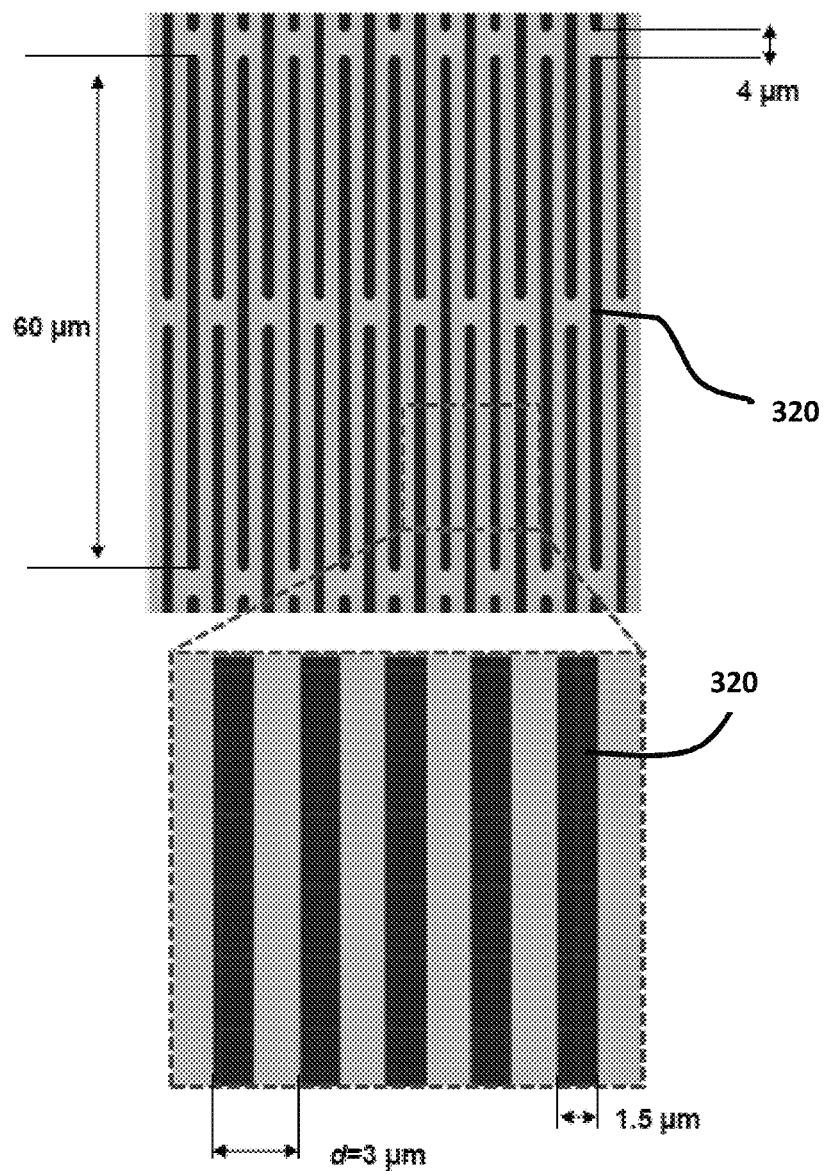

FIG. 18 shows a schematic illustration of the microscale dimensions of kirigami cutting to form a multilayered polymeric stretchable tunable optic grating structure in accordance with certain aspects of the present disclosure.

Figure 19:
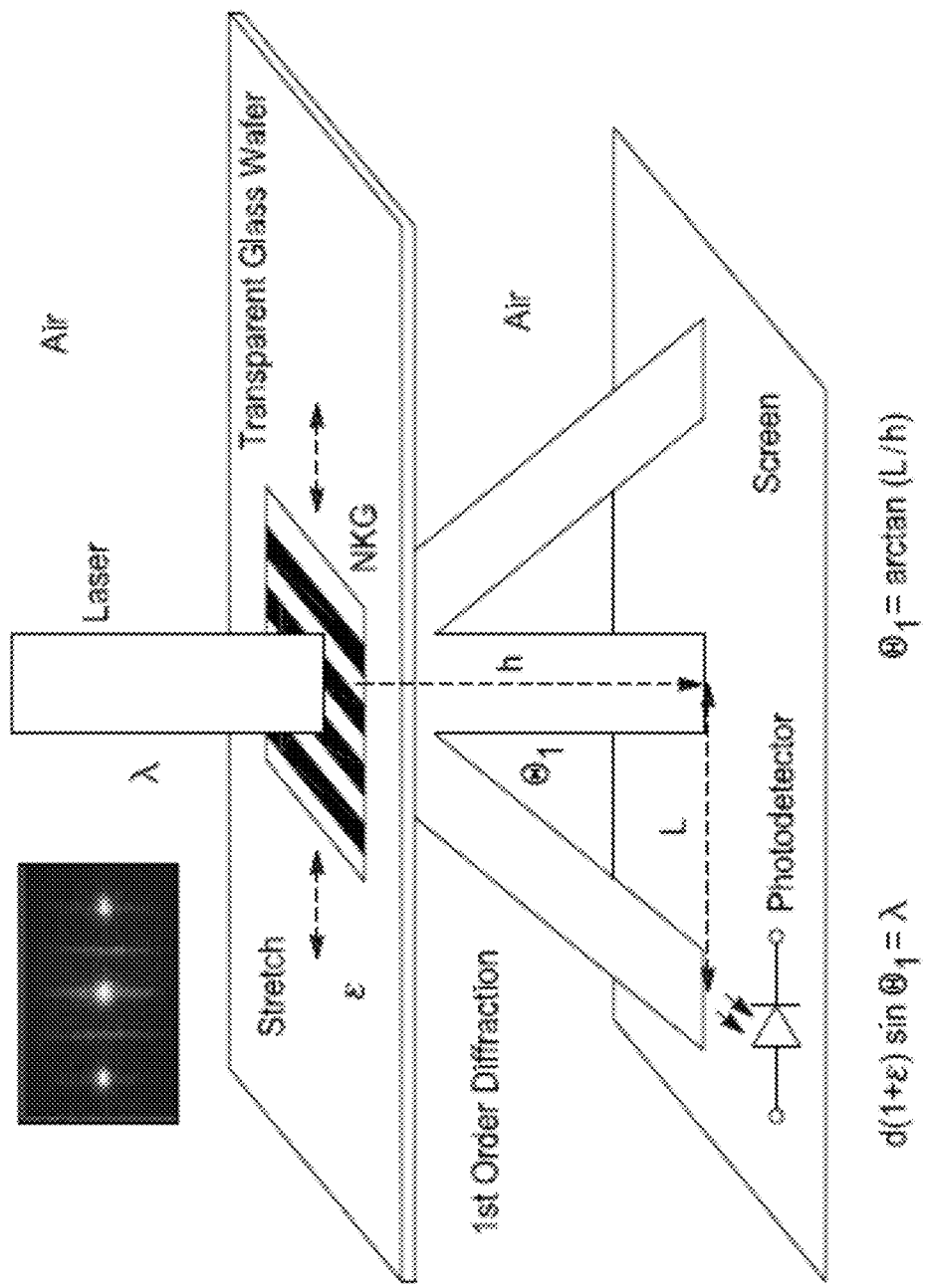

FIG. 19 shows a schematic illustration of an experimental setup for characterization of the first order diffraction of stretchable polymeric tunable optic grating structures prepared in accordance with certain aspects of the present disclosure.

Figures 20A, 20B, 20C:
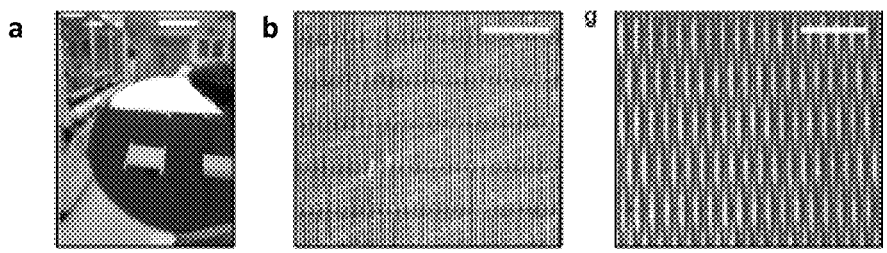

FIGS. 20(a)-20(c): images of polymeric stretchable tunable optic grating structures prepared in accordance with certain aspects of the present disclosure. FIG. 20(a) is an optical image of two nanocomposite polymeric stretchable tunable optic gratings fabricated on a glass wafer. FIGS.

20(b)-20(c) show SEM images of a nanocomposite polymeric stretchable tunable optic grating with 0% (FIGS. 20(b)) and 100% (FIG. 20(c)) mechanical stretch. Scale bars: 50 μm.

Figures 21A, 21B, 21C, 21D, 21E, 21F, 21G, 21H, 21I:
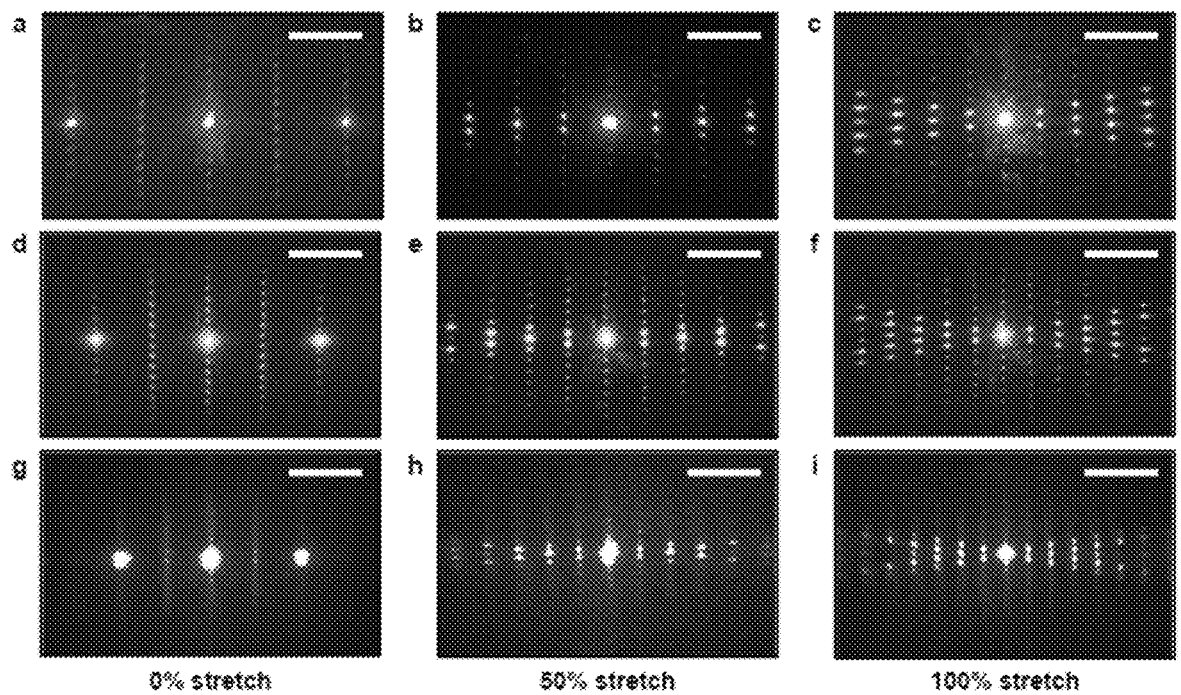

FIGS. 21(a)-21(i): transmissive laser diffraction patterns generated with polymeric stretchable tunable optic grating structures prepared in accordance with certain aspects of the present disclosure. FIGS. 21(a)-21(c) are diffraction patterns generated with a 635 nm wavelength laser. FIGS. 21(d)-21(f) are diffraction patterns generated with a 532 nm wavelength laser. FIGS. 21(g)-21(i) are diffraction patterns generated with a 450 nm wavelength laser. FIGS. 21(a), 21(d) and 21(g) have 0% stretching. FIGS. 21(b), 21(e), and 21(h) have 50% stretching, while FIGS. 21(c), 21(f) and 21(i) have a 100% stretching state. Scale bars: 25 mm.

Figures 22A, 22B, 22C, 22D, 22E, 22F:
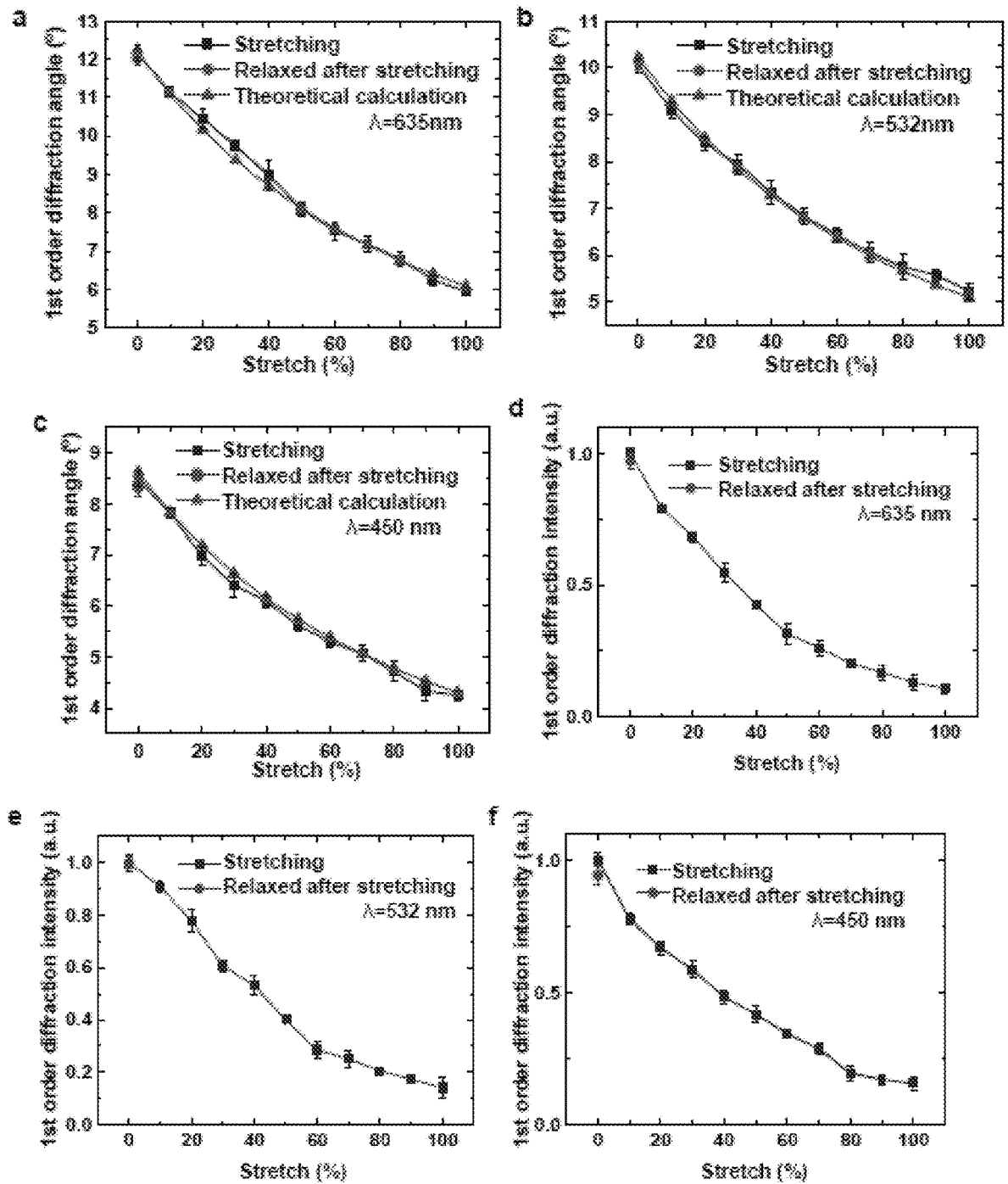

FIGS. 22(a)-22(f): quantitative analyses on the diffraction properties of polymeric stretchable tunable optic grating structures prepared in accordance with certain aspects of the present disclosure. FIGS. 22(a)-22(c) show experimental data and theoretical calculations of the first order diffraction angle as a function of stretch applied on nanocomposite polymeric stretchable tunable optic gratings prepared in accordance with certain aspects of the present disclosure, with incident light wavelengths of 650 nm (FIG. 22(a)), 532 nm (FIG. 22(b)), and 450 nm (FIG. 22(c)). FIGS. 22(d)-22(f) show normalized intensity of the first order diffracted beam as a function of the stretch applied on nanocomposite polymeric stretchable tunable optic gratings, measured with the incident wavelength of 650 nm (FIG. 22(d)), 532 nm (FIG. 22(e)), and 450 nm (FIG. 22(f)). Error bars denote standard deviation.

Figure 23:
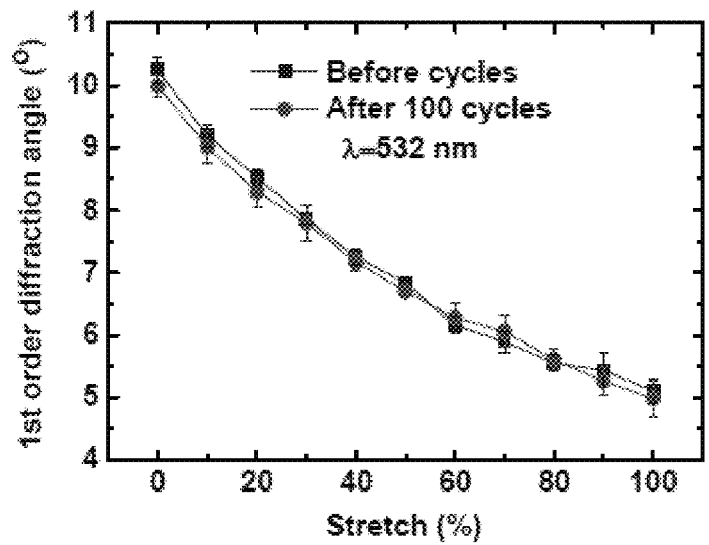

FIG. 23 shows first order diffraction angle as a function of stretch, before and after 100 cycles of 100% stretch for a polymeric stretchable tunable optic grating structures prepared in accordance with certain aspects of the present disclosure. Error bars denote standard deviation.

Figure 24:
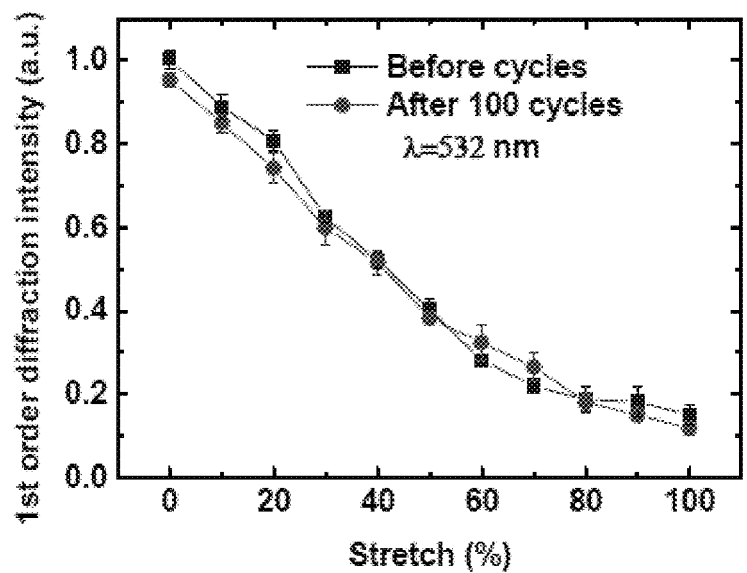

FIG. 24 shows an intensity of first order diffracted beam as a function of stretch, before and after 100 cycles of 100% stretching for a polymeric stretchable tunable optic grating structures prepared in accordance with certain aspects of the present disclosure. Error bars denote standard deviation.

Figures 25A, 25B, 25C, 25D, 25E, 25F:
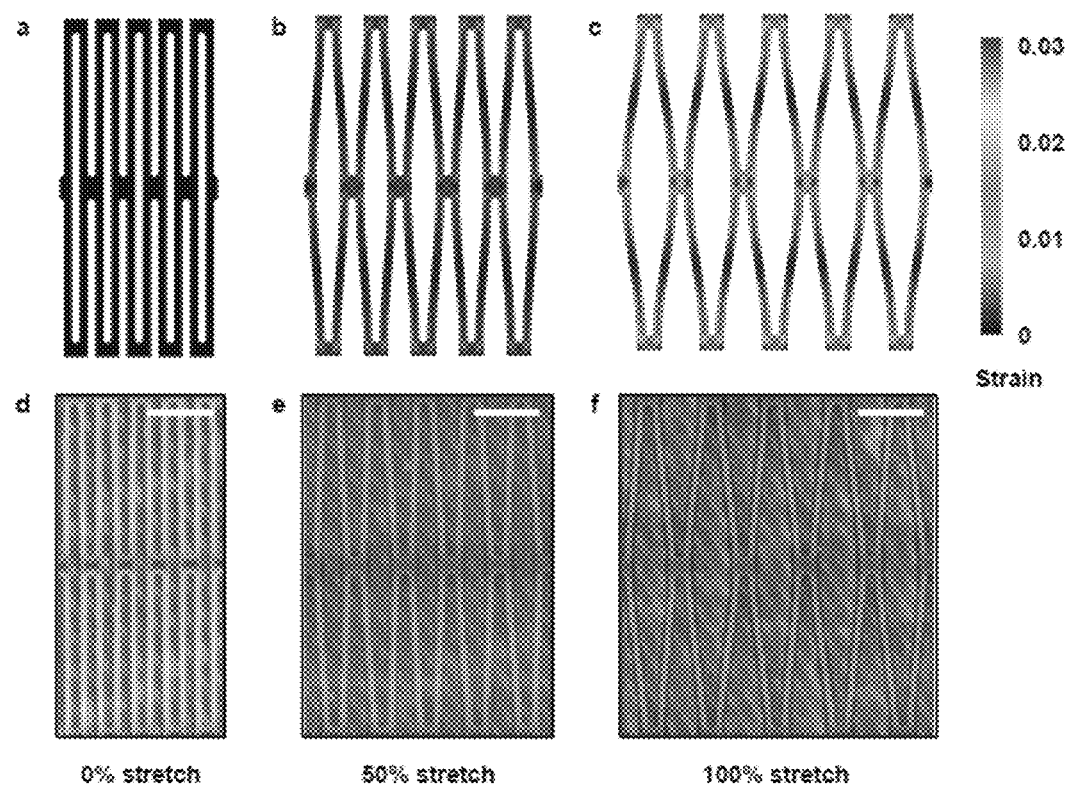

FIGS. 25(a)-25(f): FEM studies of polymeric stretchable tunable optic grating structures prepared in accordance with certain aspects of the present disclosure. FIGS. 25(a)-25(c) show FEM simulation of the morphology change and strain distribution of a representative nanocomposite polymeric stretchable tunable optic grating cell under 0% (FIG. 25(a)), 50% (FIG. 25(b)), and 100% (FIG. 25(c)) stretch. FIGS. 25(d)-25(f) show SEM images of the corresponding polymeric stretchable tunable optic grating structures under 0% (FIG. 25(d)), 50% (FIG. 25(e)), and 100% (FIG. 25(f)) stretch or expansion levels. Scale bars: 10 nm.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Thus, the description and specific examples, while indicating features and embodiments, are intended for purposes of illustration only and are not intended to limit the scope of the disclosure. Moreover, recitation of multiple embodiments having stated features is not intended to exclude other embodiments having additional features, or other embodiments incorporating different combinations of the stated features. Specific examples are provided for illustrative purposes of how to make and use the described methods, systems, and compositions and, unless explicitly stated otherwise, are not intended to be a representation that given embodiments have, or have not, been made or tested. Features discussed in the context of one embodiment are intended to be applicable to other embodiments, unless otherwise indicated.

The terminology used herein is for the purpose of describing particular example embodiments only and is not intended to be limiting. As used herein, the singular forms "a," "an," and the may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

In certain aspects, the present disclosure provides methods to increase the strain capabilities and stiffness of polymeric materials, such as composite materials (including highly conductive composite materials), by applying a concept from the ancient Japanese art of paper cutting known as "kirigami." The present disclosure thus provides a kirigami approach to engineer elasticity by using a plurality of cuts or notches that create a network on a planar polymeric material, such as a composite or nanocomposite material. Such cuts can be made by top-down patterning techniques to uniformly distribute stresses and suppress uncontrolled high-stress singularities within the polymeric or nanocomposite material. This approach can prevent unpredictable local failure and increases the ultimate strain of rigid sheets from 4% to 370%, by way of non-limiting example.

Indeed, in accordance with certain aspects of the present disclosure, stiff nanocomposites sheets acquire unusually high extensibility after microscale kirigami patterning, the result of stress delocalization over numerous preset deformation points. Kirigami cut composites also pave a way toward predictive deformation mechanics and provide a systematic means to engineer elasticity. Moreover, the patterning has only a negligible impact on the electrical conductance of macroscale sheets of conductive nanocomposites. These kirigami cut-patterned composite sheets maintain their electrical conductance over the entire strain regime, in marked contrast to most stretchable conductors. Thus, in certain aspects, the present disclosure enables the use of stretchable kirigami nanocomposites as conductive structures, such as an electrode that can control plasma discharge under strain. Further, the use of stretchable kirigami with variable textures can be used to tune plasma discharge phenomena. This unique combination of unusual mechanics, tunable out-of-plane deformation, and high conductance under strain opens up a wide range of technological applications.

In traditional kirigami, cut patterns are introduced into paper sheets to attain a desirable topology upon folding. As discussed above, suitable techniques that can be used in accordance with the present disclosure to form cuts (extending from one side to the other) in a polymeric or composite material can be standard top-down techniques, such as photolithography. Thus, the concepts of kirigami processing can be applied to the micro- or potentially nano-scale (FIGS. 3(b)-3(d)). This fabrication process offers both scalability and accuracy, providing a capability to produce similar patterns across multiple length scales.

In certain aspects, the present disclosure provides a structure comprising a composite, such as a nanocomposite. In other aspects, the present disclosure contemplates a multi-layered structure having at least two layers, where at least one layer is a polymeric material. The polymeric material may be a composite or nanocomposite material. The composite material comprises a matrix material, such as a polymer, a polyelectrolyte, or other matrix (e.g., cellulose paper), and at least one reinforcement material distributed therein. In certain aspects, the present disclosure pertains to nanocomposite materials that are composite materials comprising a reinforcement nanomaterial, such as nanoparticles. The composite may be in the form of a sheet or film in certain variations.

A "nanoparticle" is a solid or semi-solid material that can have a variety of shapes or morphologies, however, which are generally understood by those of skill in the art to mean that the particle has at least one spatial dimension that is less than or equal to about 10 µm (10,000 nm). In certain aspects, a nanoparticle has a relatively low aspect ratio (AR) (defined as a length of the longest axis divided by diameter of the component) of less than or equal to about 100, optionally less than or equal to about 50, optionally less than or equal to about 25, optionally less than or equal to about 20, optionally less than or equal to about 15, optionally less than or equal to about 10, optionally less than or equal to about 5, and in certain variations, equal to about 1. In other aspects, a nanoparticle that has a tube or fiber shape has a relatively high aspect ratio (AR) of greater than or equal to about 100, optionally greater than or equal to about 1,000, and in certain variations, optionally greater than or equal to about 10,000.

In certain variations, a nanoparticle's longest dimension is less than or equal to about 100 nm. In certain embodiments, the nanoparticles selected for inclusion in the nanocomposite are electrically conductive nanoparticles that create an electrically conductive nanocomposite material. The nanoparticles may be substantially round-shaped nanoparticles, that have low aspect ratios as defined above, and that have a morphology or shape including spherical, spheroidal, hemispherical, disk, globular, annular, toroidal, cylindrical, discoid, domical, egg-shaped, elliptical, orbed, oval, and the like. In certain preferred variations, the morphology of the nanoparticle has a spherical shape. Alternatively, the nanoparticle may have an alternative shape, such as a filament, fiber, rod, a nanotube, a nanostar, or a nanoshell. The nanocomposite may also include combinations of any such nanoparticles.

Furthermore, in certain aspects, a particularly suitable nanoparticle for use in accordance with the present teachings has a particle size (an average diameter for the plurality of nanoparticles present) of greater than or equal to about 10 nm to less than or equal to about 100 nm. The conductive nanoparticles may be formed of a variety of conductive materials including metallic, semiconducting, ceramic, and/or polymeric nanoscale particles having plurality of shapes. The nanoparticles may comprise conductive materials, such as carbon, graphene/graphite, graphene oxide, gold, silver, copper, aluminum, nickel, iron, platinum, silicon, cadmium, mercury, lead, molybdenum, iron, and alloys or compounds thereof. Thus, suitable nanoparticles can be exemplified by, but are not limited to, nanoparticles of graphene oxide, graphene, gold, silver, copper, nickel, iron, carbon, platinum, silicon, seedling metals, CdTe, CdSe, CdS, HgTe, HgSe, HgS, PbTe, PbSe, PbS, $MoS_2$, $FeS_2$, FeS, FeSe, $WO_{3-x}$, and other similar materials known to those of skill in the art. Graphene oxide is a particularly suitable conductive material for use as reinforcement in the composite. In certain variations, the nanoparticles can comprise carbon nanotubes, such as single walled nanotubes (SWNTs) or multi-walled nanotubes (MWNTs), for example. Single-walled carbon nanotubes (SWNT) are formed from a single sheet of graphite or graphene, while multi-walled carbon nanotubes (MWNT) consist of multiple cylinders arranged in a concentric fashion. The typical diameters of SWNT can range from about 0.8 nm to about 2 nm, while MWNT can have diameters in excess of 100 nm.

In certain variations, the nanocomposite may comprise a total amount of a plurality of nanoparticles of greater than or equal to about 1% by weight to less than or equal to about 97% by weight, optionally greater than or equal to about 3% by weight to less than or equal to about 95% by weight, optionally greater than or equal to about 5% by weight to less than or equal to about 75% by weight, optionally greater than or equal to about 7% by weight to less than or equal to about 60% by weight, optionally greater than or equal to about 10% by weight to less than or equal to about 50% by weight of a total amount of nanoparticles in the nanocomposite. Of course, appropriate amounts of nanoparticles in a composite material depend upon material properties, percolation thresholds, and other parameters for a particular type of nanoparticle in a specific matrix material.

In certain variations, the nanocomposite may comprise a total amount of a matrix material of greater than or equal to about 1% by weight to less than or equal to about 97% by weight, optionally greater than or equal to about 10% by weight to less than or equal to about 95% by weight, optionally greater than or equal to about 15% by weight to less than or equal to about 90% by weight, optionally greater than or equal to about 25% by weight to less than or equal to about 85% by weight, optionally greater than or equal to about 35% by weight to less than or equal to about 75% by weight, optionally greater than or equal to about 40% by weight to less than or equal to about 70% by weight of a total amount of matrix material in the nanocomposite.

In certain variations, the nanocomposite material comprises a plurality of electrically conductive nanoparticles and has an electrical conductivity of greater than or equal to about $1.5 \times 10^3$ S/cm. In certain aspects, the electrically conductive nanocomposite has an electrical conductivity of greater than or equal to about $1 \times 10^5$ S/cm, optionally greater than or equal to about $1.1 \times 10^5$ S/cm, optionally greater than or equal to about $1 \times 10^6$ S/cm, optionally greater than or equal to about $2 \times 10^6$ S/cm, optionally greater than or equal to about $3 \times 10^6$ S/cm, optionally greater than or equal to about $4 \times 10^6$ S/cm, optionally greater than or equal to about $5 \times 10^6$ S/cm, optionally greater than or equal to about $6 \times 10^6$ S/cm, optionally greater than or equal to about $7 \times 10^6$ S/cm, optionally greater than or equal to about $8 \times 10^6$ S/cm, and in certain variations, optionally greater than or equal to about $8.6 \times 10^6$ S/cm.

In certain other aspects, the nanocomposite material may comprise a plurality of electrically conductive nanoparticles as a reinforcement nanomaterial and thus may have an electrical resistivity of less than or equal to about $1 \times 10^{-4}$ Ohm·m, optionally less than or equal to about $9 \times 10^{-5}$ Ohm·m, optionally less than or equal to about $8 \times 10^{-5}$ Ohm·m, optionally less than or equal to about $7 \times 10^{-5}$ Ohm·m, optionally less than or equal to about $6 \times 10^{-5}$ Ohm·m, optionally less than or equal to about $5 \times 10^{-5}$ Ohm·m, optionally less than or equal to about $4 \times 10^{-5}$ Ohm·m, optionally less than or equal to about $3 \times 10^{-5}$ Ohm·m, optionally less than or equal to about $2 \times 10^{-5}$ Ohm·m, optionally less than or equal to about $1 \times 10^{-5}$ Ohm·m, optionally less than or equal to about $9 \times 10^{-6}$ Ohm·m, optionally less than or equal to about $8 \times 10^{-6}$ Ohm·m, optionally less than or equal to about $7 \times 10^{-6}$ Ohm·m, optionally less than or equal to about $6 \times 10^{-6}$ Ohm·m, optionally less than or equal to about $5 \times 10^{-6}$ Ohm·m, optionally less than or equal to about $4 \times 10^{-6}$ Ohm·m, optionally less than or equal to about $3 \times 10^{-6}$ Ohm·m, optionally less than or equal to about $2 \times 10^{-6}$ Ohm·m, and in certain embodiments, optionally less than or equal to about $1 \times 10^{-6}$ Ohm·m.

In certain other variations, an impedance (Z) of the electrically conductive nanocomposite comprising a plurality of nanoparticles may be less than or equal to about $1 \times 10^4$ Ohms (e.g., measured using an AC sinusoidal signal of 25 mV in amplitude with impedance values measured at a frequency of 1 kHz), optionally less than or equal to about $9 \times 10^3$ Ohms, optionally less than or equal to about $7 \times 10^3$ Ohms, optionally less than or equal to about $5 \times 10^3$ Ohms, optionally less than or equal to about $3 \times 10^3$ Ohms. In certain variations, such impedance (Z) of an electrically conductive nanocomposite may be less than or equal to about $1 \times 10^3$ Ohms, optionally less than or equal to about $9 \times 10^2$ Ohms, optionally less than or equal to about $7 \times 10^2$ Ohms, optionally less than or equal to about $5 \times 10^2$ Ohms, optionally less than or equal to about $3 \times 10^2$ Ohms, optionally less than or equal to about $2 \times 10^2$ Ohms, and in certain variations optionally less than or equal to about $1 \times 10^2$ Ohms.

Figure 1:
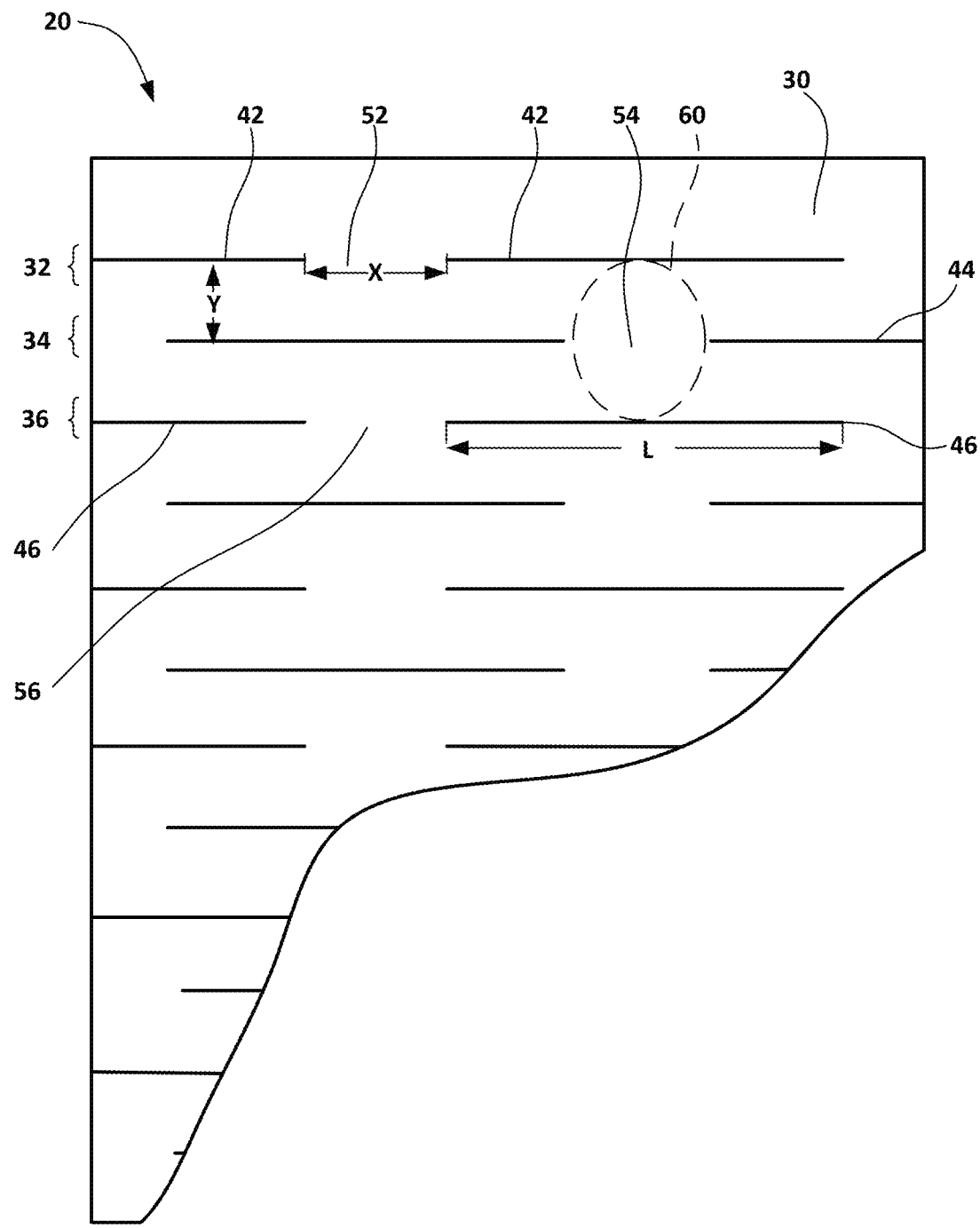
FIG. 1 is a schematic of a planar composite material having a plurality of kirigami cuts formed therein as a linear pattern in accordance with certain aspects of the present disclosure.

The polymeric or nanocomposite material may be in a planar form, such as a sheet, in an initial state (prior to being cut), but may be folded or shaped into a three-dimensional structure and thus used as a structural component after the cutting process. By way of example, FIG. 1 shows a structure 20 including a portion of an exemplary nanocomposite material sheet 30 having a surface with tessellated cut pattern. Sheet 30 includes a first row 32 of first discontinuous cuts 42 (that extend through the sheet 30 to create an opening) in a pattern that defines a first uncut region 52 between the discontinuous cuts 42. A discontinuous cut is a partial or discrete cut formed in the sheet that leaves the entire sheet intact in its original dimensions, rather than being divided into separate smaller sheets or portions. If multiple discontinuous cuts 42 are present, desirably at least some of them are noncontiguous and unconnected with one another so that at least one uncut region remains on the sheet as a bridge between the discontinuous sheets. While many cut patterns are possible, a simple kirigami pattern of straight lines in a centered rectangular arrangement (FIG. 1, see also inset of FIG. 4) is used herein as an exemplary pattern. The first uncut region 52 has a length "x." Each discontinuous cut 42 has a length "L."

In certain aspects, the length of each discontinuous cut (e.g., discontinuous cut 42) may be on the micro- meso-, nano- and/or macroscales. Macroscale is typically considered to have a dimension of greater than or equal to about 500 μm (0.5 mm), while mesoscale is greater than or equal to about 1 μm (1,000 nm) to less than or equal to about 500 μm (0.5 mm). Microscale is typically considered to be less than or equal to about 100 μm (0.5 mm), while nanoscale is typically less than or equal to about 1 μm (1,000 nm). Thus, conventional mesoscale, microscale, and nanoscale dimensions may be considered to overlap. In certain aspects, the length of each discontinuous cut may be on a microscale, for example, a length that is less than about 100 μm (i.e., 100,000 nm), optionally less than about 50 μm (i.e., 50,000 nm), optionally less than about 10 μm (i.e., 10,000 nm), optionally less than or equal to about 5 μm (i.e., 5,000 nm), and in certain aspects less than or equal to about 1 μm (i.e., 1,000 nm). In certain aspects, the discontinuous cuts 42 may have a length that is less than about 50 μm (i.e., 50,000 nm), optionally less than about 10 μm (i.e., 10,000 nm), and optionally less than about 1 μm (i.e., less than about 1,000 nm).

In certain variations, these dimensions can be reduced by at least 100 times to a nanoscale, for example a cut having a length of less than or equal to about 1 μm (1,000 nm), optionally less than or equal to about 500 nm, optionally less than or equal to about 400 nm, optionally less than or equal to about 300 nm, optionally less than or equal to about 200 nm, optionally less than or equal to about 100 nm, optionally less than or equal to about 75 nm, optionally less than or equal to about 50 nm, optionally less than or equal to about 40 nm, optionally less than or equal to about 30 nm, optionally less than or equal to about 20 nm, and in certain variations, optionally less than or equal to about 10 nm.

Thus, in certain variations, the length of each discontinuous cut 42 may be on a microscale, for example, a length that is less than about 100 μm (i.e., 100,000 nm), optionally less than about 50 μm (i.e., 50,000 nm), optionally less than about 10 μm (i.e., 10,000 nm), optionally less than or equal to about 5 μm (i.e., 5,000 nm), and in certain aspects less than or equal to about 1 μm (i.e., 1,000 nm). In certain aspects, the discontinuous cuts 42 may have a length that is less than about 50 μm (i.e., 50,000 nm), optionally less than about 10 μm (i.e., 10,000 nm), and optionally less than about 1 μm (i.e., less than about 1,000 nm). In certain variations, these dimensions can be reduced by at least 100 times, as discussed above. It should be noted that "x" and "L" may vary within rows depending on the pattern formed, although in preferred aspects, these dimensions remain constant.

A second row 34 of second discontinuous cuts 44 is also patterned on the sheet 30. The second discontinuous cuts 44 that define a second uncut region 54 therebetween. A third row 36 of third discontinuous cuts 46 is also patterned on the sheet 30. The third discontinuous cuts 46 define a third uncut region 56 therebetween. It should be noted that the first row 32, second row 34, and third row 36 are used for exemplary and nominative purposes, but as can be seen, the tessellated pattern on the surface of sheet 30 has in excess of three distinct rows. The first row 32 is spaced apart from the second row 34, as shown by the designation "y." The second row 34 is likewise spaced apart from the third row 36. It should be noted that "y" may vary between rows, although in preferred aspects, it remains constant between rows. Such spacing between rows may likewise be on a micro- meso-, nano- and/or macroscale, as described above.

Notably, the first discontinuous cuts 42 in the first row 32 are offset in a lateral direction (along the dimension/axis shown as "x") from the second discontinuous cuts 44 in the second row 34, thus forming a tessellated pattern. Likewise, the second discontinuous cuts 44 in the second row 34 are offset in a lateral direction from the third discontinuous cuts 46 in the third row 36. Thus, the first uncut region 52, second uncut region 54, and third uncut region 56 in each respective row cooperates to form a structural bridge 60 that extends from the first row 32, across second row 34, and to third row 36.

In this regard, the sheet 30 having the patterned tessellated surface with the plurality of discontinuous cuts (e.g., 42, 44, and 46) can be stretched in at least one direction (e.g., along the dimension/axis shown as "y" or "x"). FIG. 3(c) shows a stretched sheet with a patterned surface like that shown in FIG. 1. The sheet 30 formed of a nanocomposite thus exhibits certain advantageous properties, including enhanced strain.

The present disclosure provides in various aspects, a stretchable multilayered polymeric or composite material. By "stretchable" it is meant that materials, structures, components, and devices are capable of withstanding strain, without fracturing or other mechanical failure. Stretchable materials in accordance with certain aspects of the present disclosure are extensible and thus are capable of stretching and/or compression, at least to some degree, without damage, mechanical failure or significant degradation in performance.

"Young's modulus" is a mechanical property referring to a ratio of stress to strain for a given material. Young's modulus may be provided by the expression:

$$E = \frac{(\text{stress})}{(\text{strain})} = \frac{\sigma}{\epsilon} = \frac{L_o}{\Delta L} \times \frac{F}{A}$$

where engineering stress is $\sigma$, tensile strain is $\epsilon$, E is the Young's modulus, $L_o$ is an equilibrium length, $\Delta L$ is a length change under the applied stress, F is the force applied and A is the area over which the force is applied.

In certain aspects, stretchable composite materials, structures, components, and devices may undergo a maximum tensile strain of at least about 50% without fracturing; optionally greater than or equal to about 75% without fracturing, optionally greater than or equal to about 100% without fracturing, optionally greater than or equal to about 150% without fracturing, optionally greater than or equal to about 200% without fracturing, optionally greater than or equal to about 250% without fracturing, optionally greater than or equal to about 300% without fracturing, optionally greater than or equal to about 350% without fracturing, and in certain embodiments, greater than or equal to about 370% without fracturing.

Stretchable materials of the present disclosure may also be flexible, in addition to being stretchable, and thus are capable of significant elongation, flexing, bending or other deformation along one or more axes. The term "flexible" can refer to the ability of a material, structure, or component to be deformed (for example, into a curved shape) without undergoing a permanent transformation that introduces significant strain, such as strain indicating a failure point of a material, structure, or component.

Thus, the present disclosure provides in certain aspects, a stretchable polymeric material. In further aspects, the present disclosure provides a stretchable composite material that comprises a polymer and a plurality of nanoparticles or other reinforcement materials. The polymer may be an elastomeric or thermoplastic polymer. One suitable polymer includes polyvinyl alcohol (PVA), by way of non-limiting example.

For example, for certain materials, creating the surface having patterned cuts in accordance with certain aspects of the present disclosure can increase ultimate strain of initially rigid sheets to greater than or equal to about 100% from an initial ultimate strain prior to any cutting, optionally greater than or equal to about 500%, optionally greater than or equal to about 1,000%, optionally greater than or equal to about 2,000%, optionally greater than or equal to about 3,000%, optionally greater than or equal to about 4,000%, optionally greater than or equal to about 5,000%, optionally greater than or equal to about 6,000%, optionally greater than or equal to about 7,000%, optionally greater than or equal to about 8,000%, and in certain variations, optionally greater than or equal to about 9,000%. For example, in certain nanocomposite material systems, the patterned surface created in accordance with certain aspects of the present disclosure can prevent unpredictable local failure and increase the ultimate strain of rigid sheets from 4% initially to 370% after the patterning of the surface with a plurality of cuts.

Notably, a wide range of maximum attainable strains or expansion levels can be achieved based on the geometry of the cut pattern used. The ultimate strain is thus determined by the geometry. The ultimate strain (% strain) is a ratio between a final achievable length, while being stretched to a point before the structure breaks, over the original or initial length ($L_i$):

$$\% \text{ strain} = \frac{\Delta L}{L_i} = \frac{L_c - x - 2y}{2y}$$

where $L_c$ is a length of the cut, x is spacing between discontinuous cuts, and y is distance between discrete rows of discontinuous cuts. Thus, in certain variations, the polymeric materials, such as nanocomposites, having a surface with patterned cuts in accordance with certain aspects of the present disclosure can increase ultimate strain to greater than or equal to about 100%, optionally greater than or equal to about 150%, optionally greater than or equal to about 200%, optionally greater than or equal to about 250%, optionally greater than or equal to about 300%, optionally greater than or equal to about 350%, and in certain variations, optionally greater than or equal to about 370%.

Various alternative and complex kirigami patterns can be formed on a sheet, which may define linear tessellated patterns (as described above and shown in FIGS. 1, 3(c), 4, 6(a)-6(c), 8(a), and 9(a)-9(b)), circular or oval tessellated patterns (see e.g., FIG. 8(b)), square tessellated patterns (see e.g., FIG. 8(c)), or polygonal tessellated patterns (FIG. 2), by way of non-limiting example. In certain aspects, the homogeneity of material is commensurate with the length scale of the kirigami cuts, which is true for many nanocomposites as exemplified by graphene oxide multilayers made by vacuum assisted filtration (VAF) or layer-by-layer assembly (LBL) techniques (FIG. 3(b)). In accordance with certain variations of the present disclosure, electrically conductive nanoparticle composites can be made by two distinct methods. In one process, the electrically conductive composite material capable of stretching in at least one direction is made by a layer-by-layer assembly (LBL) technique, while in a second variation; the electrically conductive composite material capable of stretching may be made by vacuum-assisted flocculation (VAF), by way of non-limiting example. LBL and VAF techniques are well known to those of skill in the art and are generally described in U.S. Pub. No. 2014/0249526 to Kotov et al., the relevant portions of which are hereby incorporated by reference.

Figure 2:
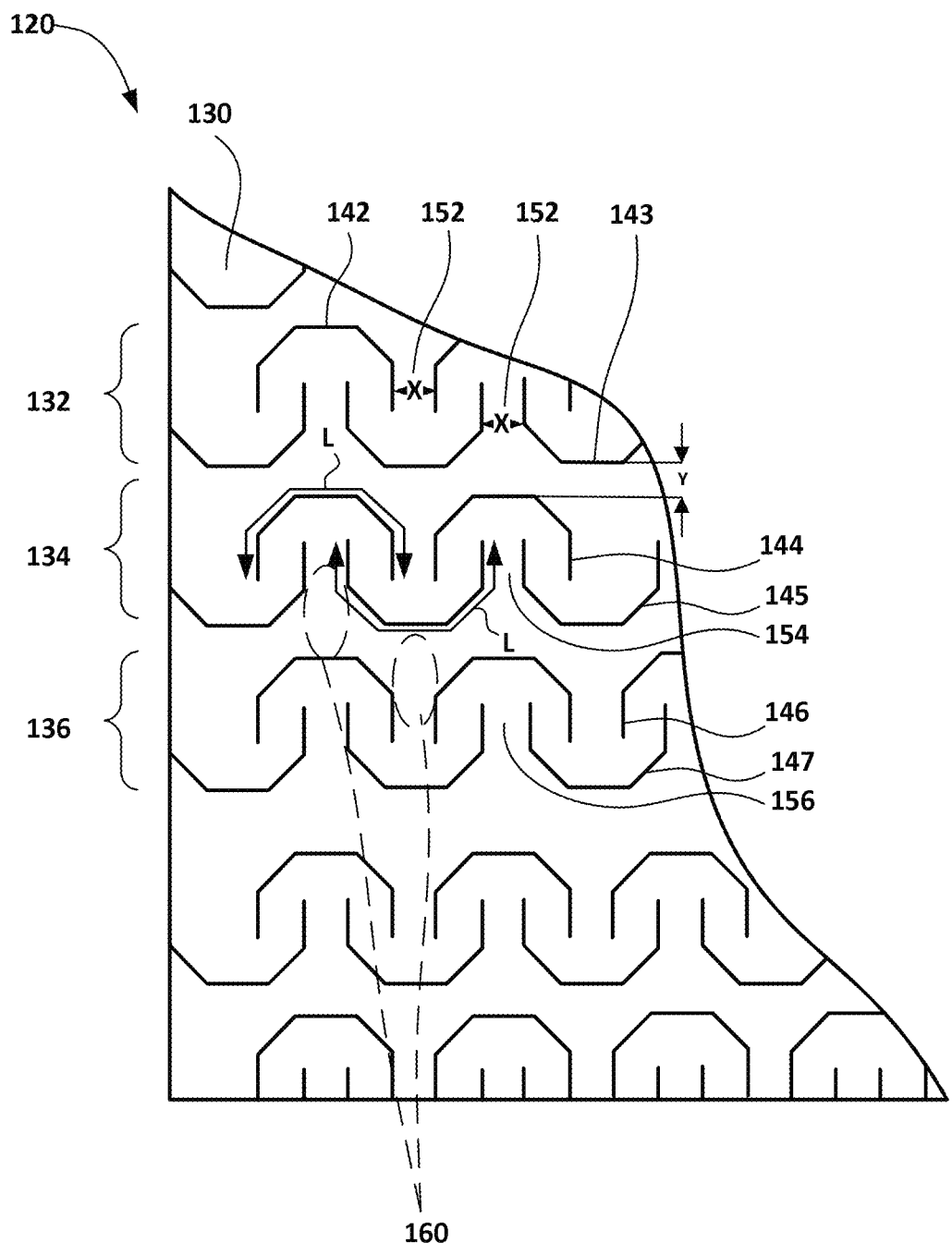
FIG. 2 is a schematic of another planar composite material having a plurality of kirigami cuts formed therein as a second distinct polygonal pattern in accordance with certain aspects of the present disclosure.

An exemplary complex polygon shaped tessellated kirigami pattern is shown in FIGS. 2 and 3(d). In FIG. 2, a structure 120 includes a portion of a nanocomposite material sheet 130 having a surface with tessellated cut pattern defining complex polygonal shapes. Sheet 130 includes a first row 132 that defines a plurality of first discontinuous upper cuts 142 and first discontinuous lower cuts 143 (that extend through the sheet 130 to create an opening) in a pattern that defines first uncut regions 152 between the first discontinuous upper cuts 142 and lower cuts 143. Each first discontinuous upper cut 142 defines an angled cut with 5 sides (a half of a decahedron). Each first discontinuous lower cut 143 likewise defines a symmetrical angled cut with 5 sides. Notably, the first discontinuous upper cuts 142 are offset in a lateral direction from first discontinuous lower cuts 143 along the dimension/axis shown as "x," thus forming a tessellated pattern. The first uncut regions 152 having varying lengths "x" depending on where along the polygon shape the width is measured. Each first discontinuous upper cut 142 and first discontinuous lower cut 143 has a length "L." In certain aspects, the length L may be on a macroscale, microscale, mesoscale, or nanoscale, as described above. It should be noted that "x" and "L" may vary within rows depending on the pattern formed, although in preferred aspects, these dimensions remain constant.

A second row 134 is also patterned on the sheet 130. The second row 134 includes second discontinuous upper cuts 144 and second discontinuous lower cuts 145 that between them define a plurality of second uncut regions 154 between the second discontinuous upper cuts 144 and lower cuts 143. Each second discontinuous upper cut 144 and second discontinuous lower cut 145 defines an angled cut with 5 sides (a half of a decahedron).

A third row 136 of third discontinuous upper cuts 146 and third discontinuous lower cuts 147 are also patterned on the sheet 130. The third discontinuous upper cuts 146 and third discontinuous lower cuts 147 define third uncut regions 156 therebetween. It should be noted that the first row 132, second row 134, and third row 136 are used for exemplary and nominative purposes, but as can be seen, the tessellated pattern on the surface of sheet 130 has in excess of three distinct rows. The first row 132 is spaced apart from the second row 134, as shown by the designation "y." The second row 134 is likewise spaced apart from the third row 136. It should be noted that "y" may vary between rows, although in preferred aspects, it remains constant between rows. Such spacing between rows may likewise be on a micro- meso-, nano- and/or macroscales, as described above in the context of the discontinuous cuts.

Notably, the first discontinuous lower cuts 143 in the first row 132 are offset in a lateral direction (along the dimension/axis shown as "x") from the second discontinuous upper cuts 144 in the second row 134, thus forming a tessellated pattern. Likewise, the second discontinuous lower cuts 145 in the second row 134 are offset in a lateral direction from the third discontinuous upper cuts 146 in the third row 136. Thus, the first uncut regions 152, second uncut regions 154, and third uncut regions 156 in each respective row cooperate to form a plurality of structural struts or bridges 160 that extend between the first row 132 to the second row 134 or across the second row 134 to third row 136.

In this regard, the sheet 130 having the patterned tessellated surface with the plurality of discontinuous cuts (e.g., 142, 143, 144, 145, 146, and 147) can be stretched in at least one direction (e.g., along the dimensions/axes shown as "y" or "x"). FIG. 3(d) shows a stretched sheet with a patterned surface like that shown in FIG. 2. The sheet 130 formed of a polymeric materials, such as a nanocomposite, thus exhibits certain advantageous properties, including enhanced strain. For example, for certain materials, creating the surface having patterned cuts in accordance with certain aspects of the present disclosure can increase ultimate strain of initially rigid sheets to greater than or equal to about 100% from an initial ultimate strain prior to any cutting or any of those strain ranges previously discussed above.

FIG. 3(a) shows an exemplary photolithography process for forming a kirigami pattern on a sheet of composite material in accordance with certain aspects of the present disclosure. First, a planar sheet of nanocomposite 170 is disposed on a substrate of glass 172, as shown at Step 1. It should be noted that such a process may also be conducted on a multilayered sheet including at least one polymeric layer. Then, a photoresist 174 is selectively applied over the nanocomposite in Step 2. As shown in Step 2, the photoresist 174 is applied over the entire surface of the nanocomposite 170 and developed, although in alternative variations, the photoresist 174 may be selectively applied. A plurality of openings 176 can be patterned into the photoresist 174 via treatment steps known in the art. Thus, a photoetching process (e.g., applying light such as UV radiation) shown in Step 3 etches through the openings 176 in the photoresist 174. The photoresist 174 thus defines a mask with openings 176. Notably, such development steps are exemplary and may be reversed or altered depending on whether a positive photoresist or negative photoresist is employed. Next, the photoresist 174 may be treated, for example, with oxygen plasma etching that penetrates through the nanocomposite material 170 and creates a plurality of cuts 178 that extend through the thickness of the nanocomposite 170, as shown in Step 4. Other types of etching may be also be used. Further, the creating of openings and cutting through the nanocomposite may be consolidated into a single processing step. The nanocomposite 170 having kirigami patterned cuts 178 can then be removed from the substrate 172 to be used as a structure in various applications.

While many cut patterns are possible, a simple kirigami pattern consisting of straight lines in a centered rectangular arrangement (FIG. 4 inset) made of tracing paper (Young's modulus, E=1.2 GPa) provides an experimentally convenient model that can be used to predict composite material behavior. A description of deformation patterns taking place in such a material is thus provided. The original material without patterning shows a strain of about 4% before failure; its deformation primarily involves stretching of the individual nano- micro-, and macroscale cellulose fibers (FIG. 4 gray curve). With a single cut in the middle of the sample, the stress-strain curve shows a slight decrease of ultimate strength, but otherwise behaves similarly to the pristine paper (dashed blue).

In contrast, a sheet of the same paper with the tessellated kirigami cuts (green) shows markedly different tensile behavior. The initial elasticity at <5% strain (FIG. 4: mode I) arises from stretching the material. As the applied tensile force exceeds a critical buckling force, the initially planar sheet starts to deform, as the thin struts formed by the cuts open up (FIGS. 9(a)-9(c)). Within secondary elastic plateau regime (FIG. 4: mode II), buckling occurs at the struts or bridges as they rotate to align with the applied load and deformation occurs out of the plane of the sample. During the deformation process, kirigami patterned sheets exhibit out-of-plane deflection due to mechanical bistability (FIGS. 8(a)-8(c)). Bistable configuration induces mechanical instability. Thus, kirigami cuts induce mechanical bistability, which can cause either clockwise or counterclockwise out-of-plane deflection (FIGS. 8(a)-8(c)). As each sample extends under uniaxial tension, the system chooses a favorable configuration by bending out of plane. The kirigami nanocomposites can bend either in the clockwise or counterclockwise direction. The deflecting direction is biased by pulling slightly in the desired direction to demonstrate the bistable configuration. This out-of-plane deflection can be used to impart additional functionality, as demonstrated and discussed below. Finally, the alignment of the struts causes the overall structure to densify perpendicular to the pulling direction (FIG. 4: mode III). Failure then begins when the ends of the cuts tear and crease due to high stress at these regions.

The effect of the kirigami pattern on the overall mechanical response can be evaluated using beam deflection analysis. Force analysis using beam theory for linear kirigami cut patterns assumed beam deflection in a kirigami system to analytically predict the scaling of the force associated with bistable configurations. A typical linear kirigami pattern is shown in FIG. 9(a) similar to the pattern in FIG. 1, for which the characteristic cut parameters are the cut length, $L_C$, and the distance between rows of cuts in the axial, y, and transverse, x, directions. Individual struts are formed by kirigami as bridges or beams (FIGS. 9(a)-9(c)), thus the beam length is related to the length of the cut (L or $L_C$), the spacing in the transverse direction (x), and the spacing in the axial direction (y). Beam deflection analysis predicts that the critical force scales with $$\frac{Eyt^3}{(L_C - x)^3},$$

where E is Young's modulus, and t is the thickness of the sheet.

FIGS. 9(a)-9(c) show that upon stretching the sample in the axial direction (see arrow in FIG. 9(a)), instabilities defined by the cut geometry cause shearing along the length of the cut, and a subsequent elongation of the sample and decrease in width. The circled region in FIG. 9(b) is approximated as a set of two beams or bridges. This part is essentially the cut length that overlaps with the row that follows approximated as two beams connected in series (FIG. 9(c)), each with a length $$\frac{L_C - x}{4}.$$

Using beam theory, deflection, d, and force, F can be related, via the following equation, approximating the beams as two free-end cantilevers joined together:

$$d = \frac{FL^3}{3EI} \quad (1)$$

where L is the beam length, E the Young's modulus of the material, and I the moment of inertia, where $$I = \frac{wt^3}{12} \quad (2)$$

Here w is the width of the beam, and t the thickness in the direction of deflection. It follows that $$d = \frac{4FL^3}{Ewt^3} \quad (3)$$

Since the two beams are connected in series, the deflection is additive such that $$d_{beam,total} = d_{beam1} + d_{beam2} = 2d_{beam1} = \frac{8FL^3}{Ewt^3} \quad (4)$$

Solving for force as a function of deflection, and substituting the kirigami unit cell parameters, $$F_{beam} = \frac{Eyt^3}{4\left(\frac{L_C - x}{4}\right)^3} = \frac{8Edyt^3}{(L_C - x)^3} \quad (5)$$

To identify the total force acting on the kirigami structure, the beams in the transverse direction (i.e., along the width of sample) and axial direction (i.e., along the length of sample shown by arrow in FIG. 9(a)) should also be considered. The beams in a given row are connected in parallel such that the forces acting on the structure for that row are additive. That is, the force per row, $F_{row}$ can be expressed as:

$$F_{row} = N_B F_{beam} \quad (6)$$

where $N_{B'}$ is the number of beams per row, in the transverse direction. In the axial direction, the beams from row to row are connected in series, such that the total force acting on the structure, $F_{Total}$ is expressed as:

$$\frac{1}{F_{Total}} = \frac{N_{rows}}{F_{row}} \quad (7)$$

where $N_R$ is the number of rows along the axial direction. Combining these equations and substituting, an expression that contains the kirigami unit cell parameters is:

$$F_{Total} = \frac{F_{row}}{N_{rows}} = \frac{N_{B'} F_{beam}}{N_{rows}} = \frac{8dN_{B'} Eyt^3}{N_{rows}(L_C - x)^3} \quad (8)$$

During the experimental testing, the paper fibers could contribute frictional forces within the material and potentially lead to the higher loading measured experimentally. The uneven cut finish arising in experiment may also lead to higher friction and other unaccounted edge effects during loading.

This approximated force-deflection relationship does not account for deformation in buckling and torsion that is experienced in the actual sample, but shows dependence on the unit cell geometry. This analysis is compared with experimental results and use FEM to understand the post-buckling behavior.

Having defined the relevant geometrical and material parameters, control over deformation is investigated by systematically varying the kirigami unit cell geometry in plane view as defined in FIG. 4 insets labeled (a)-(d): namely (a) spacing in the horizontal direction, x, (b) spacing in the vertical direction, y, and (c) cut length, $L_C$.

The experimental dimensions with varying kirigami pattern geometry are detailed in Table 1. The overall samples are 7 by 2 unit cells in the vertical and horizontal dimensions, respectively.

TABLE 1

Dimensions and geometry of the cut patterns.

|  |  | $L_C$ (mm) | x (mm) | y (mm) |
|---|---|---|---|---|
| Varying x | 1 | 7.938 | 1.488 | 1.588 |
|  | 2 | 7.938 | 2.282 | 1.588 |
|  | 3 | 7.938 | 3.770 | 1.588 |
| Varying y | 1 | 7.938 | 1.488 | 0.794 |
|  | 2 | 7.938 | 1.488 | 1.588 |
|  | 3 | 7.938 | 1.488 | 2.381 |
| Varying $L_C$ | 1 | 6.350 | 1.488 | 1.588 |
|  | 2 | 7.938 | 1.488 | 1.588 |
|  | 3 | 9.525 | 1.488 | 1.588 |
| One cut |  | 7.938 | — | — |

As expected, the critical buckling load and the size of the nonlinear elastic region—which dictates the maximum extension of the samples at failure—are strongly affected by the unit cell geometry (FIGS. 5(a)-5(c)). The critical buckling load marks the onset of buckling, where the initial elastic linear regime transitions to the nonlinear regime. The experimental results show that an increase in x-spacing shifts the stress-strain curve up, corresponding to higher critical buckling loads. An increase in y-spacing both increases the maximum extension and the critical buckling load, as expected from the beam analysis. An increased cut length ($L_C$) makes a more defective structure and softens the material, resulting in a lower critical buckling load and higher extensibility. Generally, increased feature spacing makes the sheet more rigid and imparts a higher critical buckling load, whereas increasing the cut length weakens the material, lowers its critical buckling load, and increases its extensibility.

In contrast to the usual trade-off between strength and extensibility, an increased x-spacing corresponds to the increase of both the strength and extensibility. This is because each cut is able to grow, or tear, along the cut length until it starts to coalesce, without the overall structure failing. In the process of tearing and final coalescence along the cuts, fracture energy is dissipated while allowing the sheet to extend even further. Hence, the increase of both toughness and strength here is related to the distance between the structural features, demonstrating a toughening strategy on a higher length scale. This suggests that the relationship between pattern spacing and mechanical response may be extended to other length scales and materials systems where high strains are desirable.

The key trends observed in the experiments are replicated by the FEM analysis (FIGS. 5(a)-5(c), insets), revealing geometric parameters that are in good agreement with understanding based on the beam deflection analysis. FEM accurately reproduces the general stress-strain response and reproduces the contribution of geometrical parameters. However, here FEM tends to underestimate the buckling load, and does not quantitatively replicate the overall behavior.

Quantitative fit between experiment and modeling using homogeneous sample is as follows. The FEM predicts more accurately, in terms of quantitative agreement, the behavior of a homogenous sample. Here, a crystalline polyimide film (commercially available from DuPont as KAPTON® polyimide film) is patterned by laser cutting to introduce a cut width of 10 μm. The geometry is simplified to keep x and y equal, and the geometry is denoted by two ratios, $R_1$ and $R_2$:

$$R_1 = \frac{L_c}{x} \quad (9)$$

$$R_2 = \frac{L_c}{y} \quad (10)$$

The results show that for the simplified geometry, the strain energy is inversely proportional to $R_1$ and $R_2$, indicating that the smaller the spacing, the less energy it requires to actuate the structure, and vice versa.

Microstructural effect can be at play; finite element model does not describe the tearing and breaking that occurs in such a system. Quantitative agreement can be found with the experiments by using a uniform crystalline polyimide film (commercially available as DuPont KAPTON® polyimide film), laser cut to render clean, even widths. These samples are also tested for fatigue life up to 1000 cycles running to 70% strain, with an approximate 18% strain energy fade (FIGS. 10(a)-10(b)). This result shows remarkable damage tolerance and suggests potential reversible and reconfigurable applications for the kirigami patterns.

The FEM results show that the applied load is distributed uniformly throughout the kirigami sheets, rather than concentrating on singularities with random initiation sites (FIGS. 6(a)-6(g)). Thus, high strain is accommodated to improve damage tolerance despite multiple defect sites. This deformation scheme contrasts with the deformation of typical stiff materials, where the presence of any defect acts as a stress concentrator from which cracks propagate and lead to fracture. Considering the deformation in terms of stress fields, kirigami patterns can be used to dictate stress concentrations and effectively control deformation. To further reduce the loads at the cuts, a technique widely used in fracture mechanics is employed, namely blunting the crack tip using a stress distributing geometry, such as circles (FIG. 11). In fracture mechanics, to delay the onset of failure, crack tips are often blunted to distribute stress, which is thus done here. Thus, instead of sharp edged cuts, a circular feature at the notch effectively delays the onset of tearing and leads to a larger operating window for the nonlinear elastic region.

The large strains enabled by the kirigami structures described in the present disclosure may have strain-invariant electrical conductance, potentially useful in a variety of devices, including stretchable current collectors and electrodes. As previously mentioned, during buckling deformation the kirigami samples generate an out-of-plane texture. The transition from a flat surface to a textured one can be used to modulate plasma discharge.

Example A

To make a kirigami electrode, tracing paper is infiltrated with well-dispersed single-walled carbon nanotubes (0.5 mg/mL CNT) (FIGS. 7(a)-7(b)). Kirigami patterning is similarly introduced on the CNT infiltrated paper.

Patterning of Tracing Paper

Tracing paper (Dick Blick Art Materials) is used as obtained. The cutting patterns are first drawn using AutoCAD® software, and patterned by a commercial plotter cutter (Graphtec FC4000) onto the paper sheets. The resulting patterned sheets are cut out with scissors for tensile testing.

Patterning of Composite

The composite films used for kirigami patterning are polyvinyl alcohol (PVA) with graphene oxide (GO) particles distributed therein. GO is prepared using the modified Hummer's method and freeze dried. Poly(vinyl alcohol) (99% hydrolyzed, Aldrich) is used as received. Thick composite films (1:2 by dry weight, E=5 GPa) are made by vacuum-assisted filtration (VAF), removed from the filter paper and attached to a clean glass slide to provide a flat surface for photolithography. Films made in this manner are around 5-6 μm. For composite films <1 μm thick, layer-by-layer assembly is employed to precisely control the thickness. The photoresist (MEGAPOSIT SPR220™, Shipley Company, Marlborough, Mass.) is spin-coated directly onto the film. The patterns are defined by photolithography with a photomask, followed by oxygen plasma etching. The residual photoresist is washed off with acetone, and the free-standing film is removed from the glass slide by soaking in 0.1% hydrofluoric acid and rinsed with water.

Mechanical Testing

Uniaxial tensile tests are performed by an RSA 3 dynamic mechanical analyzer (DMA) (TA instruments) with a 3.5 N load cell at a constant strain rate of 0.1 mm/s. The stress-strain data are obtained and each curve is averaged over seven samples.

Finite Element Modeling

Commercial finite element code (Abaqus 6.12) is used to explore a range of geometries in kirigami, which yields insight into the basic mechanisms governing deformation behavior. The C3D15 element is used with an approximate global mesh size of 0.5 mm. The mesh size is decreased until there is no dependence of the results on the discretization (mesh) size. The standard static procedure is used with a maximum time step of $1\times10^{-3}$ s. A boundary condition is enforced on either end of the kirigami structure: at one end a load is applied in the axial direction and constrains the boundary not to move in either of the orthogonal directions; at the opposite end clamped boundary conditions are placed such that no displacement is allowed at the end. To prevent bifurcation of the local buckling, the analysis is broken into two steps. In the first step, a small bias force is applied on the top edge of each cut approximately $1\times10^5$ times smaller than the load applied in the axial direction for the first 5% of the time steps of the computation. This biases all of the rows to buckle in the same direction but it is small enough not to affect the stress-strain relationship. In the second step of the simulation pulling is conducted solely in the axial direction.

To observe the effect of strain-tunable plasma discharge, a custom glass plasma chamber is used with vacuum outlet and argon inlet (set up shown in FIG. 12). As shown in FIG. 12, a strain-tunable plasma generator device 180 includes a plasma discharge chamber 182 having a stretchable electrically conductive electrode 184. The stretchable electrically conductive electrode 184 is formed of a nanocomposite polymeric structure comprising a polymer and an electrically conductive reinforcement nanomaterial distributed therein. The stretchable electrically conductive electrode 184 has a patterned surface defining first row of at least two discontinuous cuts and a second row of at least two discontinuous cuts offset from the first row. The first row and the second row cooperate to define a plurality of bridge structures therebetween. In this manner, the electrically conductive electrode 184 can be stretched in at least one direction indicated by the arrow.

The stretchable electrically conductive electrode 184 is in electrical communication with a source of potential 186 that may include typical electrical components, including an RF transformer 188. Ground 190 is attached on one side of the glass plasma discharge chamber 182 for observation of changes in plasma discharge under different strain levels of the stretchable electrically conductive electrode 184. The corona onset voltage is described by empirically formulated Peek's equation, where the stretchable electrically conductive electrode 184 roughness lowers the onset voltage.

The discharge chamber 182 has an inlet 192 (e.g., for introducing argon into the plasma discharge chamber 182) and an outlet 194 (e.g., a vacuum outlet for removing contents of the plasma discharge chamber 182).

A top of the plasma discharge chamber 182 is fitted with a hollow sleeve or glass tube 196. A part of a tensioning component system 198 is contained within the glass tube 196, connected to portions of the walls of the plasma discharge chamber 182, and further connected to retainer clips 199 that are attached to the stretchable electrically conductive electrode 184. In this manner, the tensioning component system 198 contained within the glass tube 196 can reversibly apply strain along the axis shown by the arrow, thus allowing for in situ reversible expansion and strain tuning capabilities, while the voltage is applied onto the Kirigami patterned stretchable electrically conductive electrode 184.

Conductivity Measurements and Kirigami Electrode

P2-SWNT single-walled nanotubes (Carbon Solutions Inc.) at a concentration 0.5 mg/mL are mixed in 2 mg/mL poly(sodium styrene sulfonate) (PSS) in deionized water and bath sonicated for 12 hours. PSS-modified SWNT solution is poured onto tracing paper and vacuum filtered to infiltrate the SWNT. Kirigami patterns are introduced on the SWNT composite paper. The conductivity as a function of strain is measured using a custom four-probe setup with copper wires bonded using silver epoxy paint (MG Chemicals). A transformer outputs a voltage of 10 kV at 20 kHz on the sample placed under vacuum, and argon (EGL Inc.) is introduced until a plasma is formed with a visible purple glow.

Upon stretching, the conductance does not change significantly from 0% to nearly 300% strain (FIG. 7(c)), indicating that the presence of the patterned notches accommodates strain while maintaining a conductive network provided by the CNT. The strain tuning of plasma discharge using the kirigami nanocomposite electrode inside an argon-filled glass tube is demonstrated. At constant voltage and pressure, the electric field concentrates at the sharp apices that arise from the strain-induced out-of-plane deformation (FIG. 7(d)). Effectively, the increased strain increases the roughness of the electrode, which lowers the corona onset voltage. Hence, as the strain level is increased, visual observation shows a higher degree of local ionization and plasma intensity, resulting from increased recombination of electron and ionic argon. The development of tunable electrodes opens up the possibility of many useful new applications.

In various aspects, the present disclosure provides a device that includes a polymeric structure having a patterned surface defining first row of at least two discontinuous cuts and a second row of at least two discontinuous cuts offset from the first row. The first row and the second row cooperate to define a plurality of bridge structures therebetween. The polymeric structure is stretchable in at least one direction.

In certain aspects, the polymeric structure is a multilayered structure comprising at least one polymeric layer. Such a multilayered structure may include one or more metal layers. Further, the at least one polymeric layer may include a reinforcement material, such as a nanomaterial, dispersed therein.

In other aspects, the polymeric structure is a nanocomposite that comprises a polymer and a reinforcement nanomaterial distributed therein.

In certain variations, the device may be a plasmonic device, where the nanocomposite comprises a plasmonic reinforcement nanomaterial. The nanocomposites of the present disclosure can be used as plasmonic kirigami nanocomposites made from a plurality of plasmonic nanomaterials, which may include $WO_{3-x}$ nanoparticles and nanowires, by way of non-limiting example. Such a plasmonic device can thus incorporate the kirigami patterned composite material as a plasmonic resonator.

In other variations, the device may an electrode incorporating a polymeric structure. For example, the polymeric structure may be a nanocomposite that is stretchable and the reinforcement nanomaterial comprises an electrically conductive material. A patterned surface on the conductive polymeric nanocomposite defines a first row of at least two discontinuous cuts and a second row of at least two discontinuous cuts offset from the first row. The first row and the second row cooperate to define a plurality of bridge structures therebetween. The polymeric structure is stretchable in at least one direction.

As noted above in the context of FIG. 12, strain-tunable plasma discharge chambers using a stretchable electrically conductive composite electrode are contemplated by the present disclosure. Further, electrodes made from stretchable electrically conductive composites having kirigami patterning can control the evolution of gas bubbles on the electrodes by stretching. The evolution of the bubbles is essential for fuel cells and certain other devices incorporating electrodes. Deformable electrodes that can withstand a wide range of strains can also be extended to a variety of flexible electronic technologies, including and beyond plasma processes. In certain other aspects, the device may be a fuel device incorporating the stretchable polymeric structure as an electrode. The polymeric structure may be a nanocomposite that is stretchable and the reinforcement nanomaterial comprises an electrically conductive material.

In yet other aspects, the device may a chiroptical device incorporating a polymeric structure. The polymeric structure may be a nanocomposite that is stretchable and has a reinforcement nanomaterial dispersed therein. A patterned surface on the polymeric structure defines a first row of at least two discontinuous cuts and a second row of at least two discontinuous cuts offset from the first row. The first row and the second row cooperate to define a plurality of bridge structures therebetween. The polymeric structure is stretchable in at least one direction. By using kirigami out-of-plane features by twisting or stretching the polymeric structure, the present disclosure contemplates use of the composite materials as chiroptical structures.

In contrast to molecular or nanoscale manipulation of strain, it is possible to control deformation with top-down kirigami patterning in accordance with the present teachings, which can be extended to multiple length scales. The new insights obtained with the present teachings can bridge the gap between nanoscale and macroscale strain engineering, while enabling novel engineering applications, in which out-of-plane deflection can be controlled to create multiscale, reconfigurable structures. Kirigami nanocomposites may find significant use in a variety of applications, including in radio frequency plasma applications, surface treatments, materials processing, plasmonics, displays, radar phase arrays, electrodes, including fuel cell electrodes, deformable structural units of electronic components, solar cells, and flexible/stretchable electronics, chiroptical structures, ozone production and corona-induced airflow, by way of non-limiting example.

In certain aspects, the present disclosure thus provides devices for dynamic, wavelength-dependent beam steering and amplitude modulation of electromagnetic waves, which are of central interest for radar, laser communication, optical data storage, fluorescence microscopy, and other applications. Diffraction gratings with tunable periodicity can enable ideal alternatives for dynamic manipulation of wave propagation. In the past, realizing such tunable gratings remains a difficult challenge, partly due to the limited strain tolerance of conventional materials used to form grating structures. Micro-electro-mechanical-system (MEMS) based gratings can provide some degree of tunability, but with the trade-offs of limited regime of working wavelengths and/or significant manufacturing sophistication. Other efforts exploit silicone elastomers with surface microgrooves, yet optimal performance of these stretchable gratings can be impaired due to complications by high strains (>0.1) in the materials. As a result, these gratings can rarely function at elongations beyond 30%, which is far below the mechanical stretchability of constituent elastomers.

Beam steering devices represent an essential aspect of advanced optics and are needed in a diverse spectrum of technologies ranging from astronomy and agriculture to bio-sensing and networked vehicles. Dynamic steering of optical beams, such as wide angle diffraction, can be used in various areas, including for information technologies, optical data storage, biomedical diagnostics, precision agriculture, weather predictions, and autonomous vehicles, by way of non-limiting example. For instance, beam steering optical elements are central to laser radars (LIDARs) and typically employed with a set of actuated mirrors.

Tunable optic gratings formed in accordance with the present disclosure provide a simple physical format and reliable performance over a large dynamic range. Due to their unique capabilities for relieving stress under large macroscopic deformation, and for guiding assembly of complex structures from simple planar elements, kirigami patterned structures provide new device architectures for tunable optical and optoelectronic components. Moreover, kirigami-patterned optics and optoelectronic devices can complement the emerging capabilities of flexible/stretchable electronics.

Diffraction gratings with strain-tunable periodicity simplify beam steering and can serve as a foundation for low-cost implementations of adaptive optics. As noted above, large strains applied to gratings can severely impair the device performance. Here, the present disclosure contemplates using micro-manufactured kirigami patterned structures formed from thin film nanocomposites based on high-performance stiff plastics, metals, and carbon nanotubes, and the like. The kirigami pattern of microscale slits reduces the stochastic concentration of strain in stiff nanocomposites, including those made by layer-by-layer (LBL) assembly. The slit patterning affords reduction of strain by two orders of magnitude for stretching deformation, and consequently enables reconfigurable optical gratings with over a 100% range of period tunability. High contrast, sophisticated diffraction patterns with as high as fifth diffraction order and reversible modulation can be obtained. The angular range of beam steering can be as large as 6.5 degrees for 635 nm laser beam as compared to an approximate 1 degree in surface-grooved elastomer gratings and approximate 0.02 degree in a MEMS grating. The versatility of the kirigami patterns, the diversity of the available nanocomposite materials, and their advantageous mechanical properties of the foundational materials open the path for engineering of reconfigurable optical elements in laser radars (LIDARs) that are used in autonomous vehicles and other optical devices with spectral range determined by the kirigami periodicity. The tunable optical gratings formed via kirigami patterning can be used as optical modulators and in various optoelectronic systems.

In certain other aspects, the present disclosure provides a tunable optic device 200, such as the simplified and exemplary design shown in FIG. 13. The tunable optic device 200 includes a housing 210. A tunable optic grating 220 is disposed within the housing 210. The tunable optic grating 220 is capable of transmitting a beam of electromagnetic radiation or light 222 directed to a first side 224 of the tunable optic grating 220. Portions 227 of the beam of light 222 are transmitted through the tunable optic grating 220 and exit from a second side 226 of the tunable optic grating 220. In certain aspects, the tunable optic grating 220 may be transmissive, while in other aspects, the tunable optic grating 220 may be reflective.

The tunable optic grating 220 comprises a stretchable polymeric structure having a patterned surface defining a first row 228 of at least two discontinuous cuts and a second row 230 of at least two discontinuous cuts offset from the first row. The first row 228 and the second row 230 cooperate to define a plurality of bridge structures therebetween. The tunable optic grating 220 is thus stretchable in at least one direction. The tunability for a grating period (% of the minimum period) may be about 100% or greater.

The tunable optic grating 220 is attached to a tensioning component or system 232. A part of a tensioning component system 232 is connected to stationary portions of the housing 210. The tensioning component system 232 is further connected to retainer clips 234 that are attached to the tunable optic grating 220. The tensioning component system 232 attached to the tunable polymeric structure reversibly stretches the tunable optic grating 220 in at least one direction shown by the arrows, thereby modifying the beam of light 222 as it is transmitted from the first side 224 through the stretchable polymeric structure/tunable optic grating 220 to the second side 226. By modifying the amount of strain or expansion of the tunable optic grating 220 via tensioning component system 232, transmitted portions 236 may be modified, for example, directed at different angles or shifted in wavelength. Suitable tensioning mechanisms are well known in the art and may include mechanical tensioners, like springs, hydraulics, such as hydraulic cylinders, and actuators.

In certain aspects, the tunable optic device 200 may further include a source of electromagnetic radiation or light 238 that generates the beam of light 222 directed at the first side 224 of the tunable optic grating 220. The source of electromagnetic radiation or light 238 may be a laser, light emitting diode, and the like. By way of non-limiting example, commercially available lasers with various wavelength ($\lambda$=635 nm, 532 nm, and 450 nm) may be used as a source of electromagnetic radiation or light 238.

It should be noted that the electromagnetic energy generated or manipulated by the tunable optic device 200 may include LIDAR (where a wavelength may vary depending on the application, for example, within the ultraviolet, visible, or near infrared ranges, for example, wavelengths may be greater than or equal to about 250 nm to less than or equal to about 10 µm). In other aspects, the electromagnetic waves may include ultraviolet light (UV) having wavelengths of about 100 nm to about 390 nm, visible light having wavelengths ranging from about 390 to about 750 nm and infrared radiation (IR) (including near infrared (NIR) ranging from about 0.75 to about 1.4 µm; short wave infrared (SWIR) ranging from about 1.4 to about 3 µm; mid wave infrared (MWIR) ranging from about 3 to about 8 µm; long wave infrared (LWIR) ranging from about 8 to about 15 µm; and far infrared (FIR) ranging from about 15 µm to 1 mm).

In certain aspects, the stretchable polymeric structure that forms the tunable optic grating 220 in FIG. 13 may comprise a multilayered structure 250 shown in FIG. 14 that comprises at least one polymer layer 260. For example, the polymer layer 260 may comprise Parylene C polymer, which is a poly(para-xylylene) polymer modified by the substitution of a chlorine atom for one of the aromatic hydrogens in each repeating xylylene units. Parylene C may serve as a structural material layer, in that it can form uniform thin films (for example, about 1.5 µm in thickness) by vapor phase deposition, and provides much greater failure strain (>0.1) comparing to typical inorganic materials (~0.01). In addition, Parylene C offers good chemical stability for both device fabrication and operation. A thickness of the polymer layer 260 may be greater than or equal to about 10 nm to less than or equal to about 2 µm.

The multilayered structure 250 may also include a conductive metal layer 262, which may comprise chromium (Cr). Other suitable conductive metals may comprise aluminum (Al), titanium (Ti), nickel (Ni), gold (Au), magnesium (Mg), tantalum (Ta), germanium (Ge), or combinations thereof. Such films may have a thickness of greater than or equal to about 10 nm to less than or equal to about 500 nm. A chromium thin film (about 40 nm in thickness) reduces optical transmission, from which the kirigami patterned structures are desirable for diffraction.

The multilayered structure 250 may having a patterned surface 264 defining a first row 266 of at least two discontinuous cuts and a second row 268 of at least two discontinuous cuts offset from the first row. The first row 266 and the second row 268 cooperate to define a plurality of bridge structures 270 therebetween. It should be noted that the multilayered structure 250 may have multiple polymer layers 260 and multiple metal layers 262. A variety of fabrication techniques may be used for forming the polymer layer(s) 260 and metal layer(s) 262, including chemical vapor deposition, physical vapor deposition, and wet chemistry formation techniques known to those of skill in the art. After formation, the discontinuous cuts can be formed in accordance with the techniques described above, including via lithographic cutting or etching. Such a multilayered structure 250 is thus stretchable in at least one direction after the cutting process. The multilayered structure 250 thus formed may be used as a tunable optic grating like that shown in FIG. 13.

In certain aspects, one or more portions of the multilayered structure may be formed via a layer-by-layer assembly (LBL) process that provides nanoscale uniformity and controllability for materials processing. Layer-by-layer assembly (LBL) provides a reliable method for fabricating layers with favorable physical characteristics. The LBL technique is well known and relies on alternating adsorption of charged species or polyelectrolytes onto a substrate. Layers are built up by sequential dipping a substrate into oppositely charged solutions having oppositely charged moieties that are attracted to the surface. Monolayers of individual components attracted to each other by electrostatic and van-der-Waals interactions are thus sequentially adsorbed on the target surface. LBL films can be constructed on a variety of solid substrates, thus imparting much flexibility for size, geometry and shape and further patterned or etched (with chemicals, plasma, electron beam, or high intensity lasers, for example). Additionally, LBL multilayers have both ionic and electronic conductivity that provides favorable charge transfer characteristics.

In an exemplary LBL method, a substrate has a first charge. A first charged material or moiety has a first polarity that is opposite to the charge of the substrate. By way of non-limiting example, the substrate may have a negative charge, while the first charged material has a positive charge. The first charged material is thus applied to a substrate in a first step, for example, by applying the first charged material onto regions of the substrate. The driving force is electrostatic attraction. Additional steps may occur between application steps, such as washing of the surface before application of the next material. After application of the first charged material to the substrate, the surface of the substrate can be exposed to a first wash material in Step 2, which is an optional step. Then, a second charged material or moiety having a second polarity opposite from the first polarity is applied over the first charged material in Step 3. Then, the surface having both the first charged material and the second charged material disposed thereon can be exposed to a second wash material in Step 4, which like Step 2 is likewise optional.

Steps 1-4 serve as a single deposition cycle that may be repeated sequentially to build distinct alternating layers of the first charged material and second charged material. A composite material layer comprises the first charged material and the second charged material. Depending on the charge of the substrate, the first charged material may be either a polycation or a polyanion (so that it is attracted to and deposited onto the surface of the substrate). Thus, the second charged material is the other of the polycation or the polyanion, having an opposite charge to the first charged material. Accordingly, a composite coating or material is formed by LBL is often referred to as: (polyanion/polycation)$_n$, where n represents the number of deposition cycles or layers present. LBL thus provides a simple tool for making thin film coating structures having homogeneously dispersed, well organized layered structures with high levels of both polyanion and polycation.

In FIG. 15, thin-film materials are sequentially deposited on a planar substrate 280 to form a multilayered structure 282 via a layer-by-layer (LBL) fabrication process. Such an LBL process can provide additive functionalities from individual components. Thus a first polymer layer 284 can be formed on the planar substrate 280. The planar substrate 280 may be glass, by way of example. The first polymer layer 284 may comprise poly(methyl methacrylate) (PMMA), by way of non-limiting example. The first polymer layer 284 may have a thickness of greater than or equal to about 10 nm to less than or equal to about 500 nm, optionally about 100 nm.

A second polymer layer 286 may comprise a second distinct polymer, such as a Parylene C polymer. The second polymer layer 286 may serve as a structural material layer. A thickness of the polymer layer 286 may be greater than or equal to about 10 nm to less than or equal to about 2 µm, optionally around 1.5 µm.

The multilayered structure 282 also includes a conductive metal layer 288, which may comprise chromium (Cr). Other suitable conductive metals may comprise aluminum (Al), titanium (Ti), nickel (Ni), gold (Au), magnesium (Mg), tantalum (Ta), germanium (Ge), or combinations thereof. Such films may have a thickness of greater than or equal to about 10 nm to less than or equal to about 500 nm. In certain variations, the metal layer may be a chromium thin film having a thickness of about 40 nm.

After formation of multiple layers via layer-by-layer technique, the discontinuous cuts can be formed in accordance with the techniques described above, including via lithographic cutting. The multilayered structure 282 may having a patterned surface 290 with a plurality of discontinuous cuts 292 with kirigami patterning. As with previous embodiments, many layers may be applied via layer-by-layer fabrication and the multilayered structure 282 may have multiple layers, in addition to just the single first polymer layer 284, second polymer layer 286, and metal layer 288. The first polymer layer 284 (e.g., comprising PMMA) may be sacrificial and can be dissolved in an appropriate solvent for release and removal from the planar substrate 280. The multilayered structure 282 thus formed may be used as a tunable optic grating like that shown in FIG. 13.

In yet another variation shown in FIG. 16, a multilayered structure 300 is formed via a layer-by-layer (LBL) fabrication process. A first polymer layer 302 can be formed on a planar substrate 304. The planar substrate 304 may be glass, by way of example. In this variation, the first polymer layer 302 may be a nanocomposite material that comprises a polymer 306 and a reinforcement nanomaterial 308 distributed therein. The reinforcement nanomaterial 308 may comprise an electrically conductive material, such as carbon nanotubes. In one variation, a function of a conductive metal thin film (like metal layer 288 in FIG. 15) is substituted with the electrically conductive nanocomposite material in the first polymer layer 302. The first polymer layer 284 may have a thickness of greater than or equal to about 10 nm to less than or equal to about 500 nm, optionally about 100 nm. The first polymer layer 302 can thus be formed by depositing carbon nanotubes/poly(vinyl alcohol) (CNT/PVA) in multiple cycles. For example, nanocomposites may have a thickness of about 100 nm, prepared by 30 repeated cycles of molecular scale LBL. The CNT/PVA nanocomposite materials offer similar optical opaqueness, but with significantly higher stretchability (>0.1 failure strain) compared with typical metallic thin films.

A second polymer layer 310 may comprise a second distinct polymer, such as a Parylene C polymer. The second polymer layer 310 may serve as a structural material layer. A thickness of the polymer layer 310 may be greater than or equal to about 10 nm to less than or equal to about 2 µm, optionally around 1.5 µm. It should be noted that while not shown, a sacrificial polymer layer may be formed between the substrate 304 and the first polymer layer 302 as described in the embodiment in FIG. 15 to facilitate release from the substrate 304.

FIG. 17 shows a scanning electron microscope (SEM) image of the surface of a CNT/PVA composite formed on top of a parylene C thin film in a multilayered polymeric structure prepared via a layer-by-layer process.

After formation via layer-by-layer technique, discontinuous cuts can be formed in accordance with the techniques described above, including via lithographic cutting. The multilayered structure 300 may having a patterned surface 312 with a plurality of discontinuous cuts 314 with kirigami patterning. The patterning may be by using micro/nanolithography and etching processes, where micrometer-scale slits are formed in a thin film with periodic and alternating patterns. See for example, FIG. 18 showing exemplary dimensions for a kirigami micropattern where micrometer-scale slits 320 have dimensions of 1.5 µm in thickness and 60 µm in length. A period between each slit is defined as "d" and is about 3 µm. Spacing between adjacent slits lengthwise in a column is about 4 µm. After patterning, the thin film can then be released from the handling substrate by selective dissolution or etching of certain materials components (PMMA or $SiO_2$). After these processing steps, the freestanding stretchable multilayered polymeric structure can be used as a tunable optic grating, which may be tuned for dynamic manipulation of light propagation, where the tunability is associated simply with the applied mechanical stretch as shown in FIG. 13. Nanocomposite kirigami with micrometer-scale patterns can thus generate highly stretchable and tunable optical gratings for dynamic manipulation of light propagation, with performance rarely achievable with conventional technologies.

Example B

Device Fabrication: A multilayered polymeric stretchable tunable optic grating structure is formed of a PMMA/Parylene C/Cr composite. A solution based poly(methyl methacrylate) (PMMA 950, MicroChem) is spin coated (3000 rpm) on a 4-inch glass wafer and baked subsequently on a 180° C. hot plate to remove the solvent. Parylene C (SCS Inc.) is deposited on the PMMA coated glass wafer by a commercially available vacuum deposition system (PDS 2035CR, SCS Inc.), forming a thin film with about 1.5 µm thickness. A thin film of chromium (about 40 nm thick) is then deposited on top of the Parylene C by sputtering (Lab 18, Kurt J. Lesker). Photolithography processes (GCA AS200 Autostep) generate patterned photoresist (S1813, Shipley) atop the thin film multilayered composites in accordance with certain aspects of the present disclosure. The corresponding pattern in the thin film composites are then formed by wet etching of Cr followed by reactive ion etching (Plasmatherm 790) of Parylene C. After these steps, the wafer is soaked in acetone for 8 hours to dissolve the PMMA layer and to release the patterned thin film composites from the glass substrate, leading to free-standing stretchable tunable optic grating.

Example C

Another multilayered polymeric stretchable tunable optic grating structure includes a (CNT/PVA) nanocomposite with a parylene layer. The CNT/PVA nanocomposite layer is deposited on a 4-inch glass wafer. The CNT/PVA nanocomposite is formed by alternating dipping processes for the glass substrate into aqueous dispersion of poly(styrene sulfonate) stabilized carbon nanotube (0.5 mg/mL), and 0.2 wt. % poly(vinyl alcohol) (MW of about 13,000-23,000, Sigma-Aldrich) aqueous solution, with rinsing and drying processes between the dipping steps generate a uniform nanocomposite thin film. 30 repeated cycles of CNT and PVA dipping steps form a thin film with thickness of about 100 nm. A Parylene C layer (about 1.5 µm in thickness) is then deposited on the CNT/PVA nanocomposites, followed by depositing a Cr thin film (about 40 nm thickness) on Parylene C. The patterning processes for the composites here are identical to the steps for PMMA/Parylene C/Cr, however the Cr layer here only serves as the mask for the reactive ion etching. After the patterning, the Cr layer is removed by wet etching, and the wafer is soaked in hydrofluoric acid (0.1 wt. %) for 8 hours to release the multilayered polymeric stretchable tunable optic grating structure from the glass substrate.

Example C

Characterization of multilayered polymeric stretchable tunable optic grating structure.

Free-standing polymeric stretchable kirigami cut structures are transferred onto another transparent glass wafer, with a small amount of water applied in between for lubricating during actuation. The measurements are performed with a custom setup shown in FIG. 19. Lasers with 635 nm wavelength and approximately 1.5 mm beam diameter (Beam of Light Technologies), 532 nm wavelength with approximately 1 mm beam diameter (Logitech), and 450 nm wavelength with approximately 3 mm beam diameter (Beam of Light Technologies) are illuminated individually from the direction normal to the plane of polymeric stretchable tunable optic grating structures prepared in accordance with certain aspects of the present disclosure.

Two pieces of silicone elastomer are brought into uniform contact with the ends of the polymeric stretchable tunable optic grating structures for applying stretch during experiments. The lasers are diffracted from three different locations on the polymeric stretchable tunable optic grating structures in each stretching state for the statistics. Diffraction angles are determined by measuring the corresponding distance in the diffraction pattern, as well as the distance between the grating and the screen. Light intensity of the diffracted beam is characterized using a commercial photometer (54-018, Edmund Optics).

FEM simulations. Commercial software (ANSYS 14.0) is employed to simulate the deformation and strain distribution of polymeric stretchable tunable optic grating structures. A model consisting of five unit cells of polymeric stretchable tunable optic grating structures is constructed in the software, with the thickness of the thin film t=1.5 µm, Young's modulus of the material E=4.8 GPa, and the Poisson's ratio of the material v=0.4. Static structural analysis accompanied with SOLID 185 element is applied, with an approximate global mesh size of 0.15 µm. Boundary conditions are enforced on both left and right ends of the model. The left boundary is fixed with no displacement allowed in all directions. A uniaxial tensile load is applied on the right boundary of the model with the displacement constrained in the tensile direction. There is no geometrical constraint applied on the rest of the model. H-Method processed with the SPARSE solver is applied for simulating the finite element model.

FIG. 20($a$) shows an optical image of polymeric stretchable kirigami cut grating structures supported on a glass wafer. The spectral dispersion of reflected ambient lights demonstrates the desired grating effect from the microstructures. Scanning electron microscopy (SEM) (Quanta 200, FEI) reveals the micro-morphology of polymeric stretchable tunable optic grating structures. FIGS. 20($b$)-20($c$) show the microstructures of a polymeric stretchable kirigami cut structure (Parylene C/Cr) with 0% and 100% mechanical stretch in the lateral direction (direction perpendicular to the micro-slits), respectively, where the amount of stretch is defined by the fractional increase of total length of the patterned structures, comparing with original un-stretched state. The distinct periodic features of the same polymeric stretchable kirigami cut structures under different stretching states indicate their unique capabilities, as confirmed in the following experiments, for dynamic manipulation of light diffraction.

Using commercially available laser sources, diffraction behavior associated with the polymeric stretchable kirigami cut tunable optic grating structures formed in accordance with the present disclosure is explored. As shown in FIGS. 21($a$)-21($i$), lasers with various wavelength ($\lambda$=635 nm, 532 nm, and 450 nm) are involved to generate transmissive diffraction patterns from polymeric stretchable tunable optic grating structures (Parylene C/Cr) under various stretching states. The clear patterns generated by lasers with millimeter scale beam diameters indicate, that the tunable optical gratings can maintain stable periodicity over macroscopic length scale even under 100% stretching. The lateral spacing in diffraction patterns shows negative correlation with the amount of stretch, which is consistent with the reciprocal relationship between the dimensions in diffraction pattern and the spacing of the corresponding grating. The longitudinal spacing in the diffraction patterns exhibits less dependency on the amount of stretch, owing to the relatively small changes in longitudinal periodicity with lateral stretch, as analyzed in latter part of this paper. The diffraction patterns also show significant dependence on the wavelength of the incoming laser.

The polymeric stretchable tunable optic grating structures present elastic behavior with the stretch and spontaneously recovers to the relaxed (i.e., un-stretched) geometry as the stretch is removed under cyclic mechanical actuation. The diffracted beams form clear patterns that change consistently with the deformation of the polymeric stretchable tunable optic grating structures. This behavior indicates excellent capability for dynamic, wavelength-dependent beam steering.

Quantitative analyses provide further evidence of the outstanding performance of polymeric stretchable tunable optic grating structures prepared in accordance with certain aspects of the present disclosure.

The first order beam diffracted in the lateral direction (FIGS. 18 and 19) is characterized as the key indicator of performance. FIGS. 21($a$)-21($i$) show the first order diffraction angles as a function of the applied stretch. The experimental data is compared with theoretical calculations obtained from a variation of the classic grating equation:

$$d(1+\varepsilon)\sin\theta_m = m\lambda$$

where d is the spacing of the slits without stretch (3 μm here), ε is the applied stretch, $\theta_m$ is the m-th order diffraction angle, and λ is the wavelength of the incident laser. For first order diffraction, m=±1. Here m=1 is assumed for simplicity. As displayed in FIGS. 22(a)-22(c), the experimental results of the first order diffraction angle show excellent agreement with theoretical predictions. The dynamic ranges for the first order diffraction angle, as defined by the ratio between the maximum value obtained from un-stretched state and the minimum value obtained with 100% stretch, are nearly 2:1 for all of the tested wavelengths. The measurements also quantitatively confirm the stability of the polymeric stretchable tunable optic grating structures prepared in accordance with certain aspects of the present disclosure under cyclic actuation, where 100 repeated stretches does not degrade the device performance (FIGS. 23 and 24). In addition to the diffraction angle, the intensity of the first order diffracted beam also shows significant correlation with the applied stretch (FIGS. 22(d)-22(f)), which is likely to be related to the change in micro-slit geometry under stretching (FIGS. 20(b) and 20(c)). This phenomenon provides the ability to modulate optical power of the diffracted beam via stretching of polymeric stretchable tunable optic grating structures prepared in accordance with certain aspects of the present disclosure.

The unique behavior of polymeric stretchable tunable optic grating structures can be further understood with the insights from micro-mechanics. Finite element methods (FEM) are employed to simulate the morphology change and the strain distribution of polymeric stretchable tunable optic grating structures prepared in accordance with certain aspects of the present disclosure under stretch, as shown in FIGS. 25(a)-25(c). SEM images of the corresponding units (Parylene C/Cr) are also presented for comparison (FIGS. 25(d)-25(f)). The lateral stretch applied on polymeric stretchable tunable optic grating structures results in expansion of the structures along the stretching direction, with relatively minor effect on the longitudinal spacing. Due to the presence of patterned micro-slits, the macroscopic elongation of the device is distributed uniformly in individual microscale periodic units, with the large deformation accommodated by bending of the beams formed between the nearest micro-slits. Remarkably, the strain distributed in the materials under stretching is nearly two orders of magnitude lower than the fractional change of grating period. Even under 100% stretch of the polymeric stretchable tunable optic grating structures, the strain level remains far below the failure strain of the structural material (Parylene C), and is mostly within elastic deformation regime (<0.015). The absence of microscale defects in SEM images also confirms the FEM results of the structural robustness under stretching. The low level of strain featured in the polymeric stretchable tunable optic grating structures enables reliable performance over large dynamic range, and opens up wide design windows for materials selection. Quantitative comparison with previously reported tunable gratings demonstrates the unique advantages of polymeric stretchable tunable optic grating structures approach. Thus, polymeric stretchable tunable optic grating structures prepared in accordance with certain aspects of the present disclosure not only present outstanding dynamic range of a grating period, but also allow both transmissive and reflective operation modes, which is essential for on-chip integration for advanced semiconductor optoelectronics.

Thus, in accordance with certain aspects of the present disclosure, a microscale kirigami approach is used to generate highly stretchable and tunable optical diffraction gratings. Such gratings may be made from layer-by-layer assembled thin film nanocomposites. The resulting devices exhibit excellent capabilities for dynamic manipulation of light diffraction, enabling wavelength-dependent beam steering and optical power modulation. The engineered micro/nanostructures lend to high degrees of tunability, simplicity and reliability of the devices. Theoretical analyses illuminate the underlying physics. The approach presented above suggests a general route for building highly tunable optical components through kirigami-inspired engineering, where different geometrical designs and materials selections can be further explored to generate various functionalities. These devices can create promising opportunities for developing advanced adaptive optical and optoelectronic systems.

All possible combinations discussed and enumerated above and herein as optional features of the inventive materials and inventive methods of the present disclosure are specifically disclosed as embodiments. In various aspects, the present disclosure contemplates a structure comprising a nanocomposite having a kirigami patterned surface defining first row of at least two discontinuous cuts and a second row of at least two discontinuous cuts offset from the first row. The first row and the second row cooperate to define a plurality of bridge structures therebetween. The nanocomposite comprises a polymer and a reinforcement nanomaterial distributed therein and the nanocomposite is stretchable in at least one direction. Also specifically disclosed are combinations including this structure comprising a nanocomposite optionally with any one or any combination of more than one of the enumerated features (1)-(7).

The structure comprising a nanocomposite having a kirigami patterned surface may optionally have any one or any combination of more than one of the following features: (1) at least two discontinuous cuts of the first row and the second row that are microscale cuts; (2) the polymer comprising polyvinyl alcohol (PVA) and the reinforcement nanomaterial comprising a conductive nanoparticle; (3) the conductive nanoparticle comprising metals, graphene oxide, graphene, carbon nanotubes, nanowires, rods, seedling metals, and combinations thereof; (4) the first row and the second row of discontinuous cuts defining a plurality of linear structures, round structures, rectangular structures, or polygonal structures when in a stretched state; (5) the nanocomposite exhibiting an ultimate tensile strain of greater than or equal to about 100%; (6) the nanocomposite exhibiting an ultimate tensile strain of greater than or equal to about 350%; and/or (7) the nanocomposite exhibits an electrical conductivity of greater than or equal to about $1.5 \times 10^3$ S/cm when in a fully stretched position.

In other aspects, the present disclosure contemplates a photolithographic method of making a polymeric structure, such as a nanocomposite, that has a kirigami patterned surface. The method comprises disposing the nanocomposite on a substrate, where the nanocomposite comprises a polymer and a reinforcement nanomaterial distributed therein. The method also comprises applying a photoresist material to the nanocomposite and forming a pattern of openings in the photoresist material by exposing it to a source of light or energy. The nanocomposite may be etched through the openings in the photoresist material, where the etching creates a pattern in the nanocomposite defining a first row comprising at least two discontinuous cuts and a second row comprising at least two discontinuous cuts offset from the first row. The first row and the second row cooperate to define a plurality of bridge structures therebetween and the nanocomposite is stretchable in at least one direction. Also specifically disclosed are combinations including this method optionally with any one or any combination of more than one of the enumerated steps or features (8)-(15).

The photolithographic method of making a nanocomposite having a kirigami patterned surface optionally has any one or any combination of more than one of the following steps or features: (8) the disposing of the nanocomposite comprises forming the nanocomposite on the substrate via a process selected from vacuum assisted filtration (VAF) or layer-by-layer assembly (LBL); (9) the etching comprises applying oxygen plasma to the photoresist material and the nanocomposite; (10) the respective at least two discontinuous cuts of the first row and the second row are microscale cuts; (11) the polymer comprises polyvinyl alcohol (PVA) and the reinforcement nanomaterial comprises a conductive nanoparticle; (12) the conductive nanoparticle comprises metals, graphene oxide, graphene, carbon nanotubes, nanowires, rods, seedling metals, and combinations thereof; (13) the first row and the second row define a plurality of linear structures, round structures, rectangular structures, or polygonal structures when in a stretched state; (14) after the etching, the nanocomposite exhibits an ultimate tensile strain of greater than or equal to about 100%; and/or (15) after the etching, the nanocomposite exhibits an electrical conductivity of greater than or equal to about $1.5 \times 10^3$ S/cm when in a fully stretched position.

In yet other aspects, the present disclosure contemplates a device incorporating a structure comprising a polymeric structure having a kirigami patterned surface defining first row of at least two discontinuous cuts and a second row of at least two discontinuous cuts offset from the first row. The first row and the second row cooperate to define a plurality of bridge structures therebetween. The polymeric structure comprises a polymer and is stretchable in at least one direction. Also specifically disclosed are combinations including this device comprising a polymeric structure optionally with any one or any combination of more than one of the enumerated features (9)-(17).

The device comprising a polymeric structure having a kirigami patterned surface may optionally have any one or any combination of more than one of the following features: (9) the polymeric structure may be a multilayered structure comprising at least one polymeric layer. Such a multilayered structure may include one or more metal layers. Further, the at least one polymeric layer may include a reinforcement material, such as a nanomaterial, dispersed therein; (10) the polymeric structure may a nanocomposite that comprises a polymer and a reinforcement nanomaterial distributed therein; (11) the device may be a plasmonic device, where the polymeric structure is a plasmonic resonator structure that may be a nanocomposite comprising a polymer and a plasmonic reinforcement nanomaterial; (12) the device may be a plasmonic device, where the polymeric structure is a plasmonic resonator structure that may be a nanocomposite comprising a polymer and a plasmonic reinforcement nanomaterial comprising $WO_{3-x}$ nanoparticles and nanowires; (13) the device may be an electrode and the polymeric structure may be a nanocomposite that comprises a polymer and a reinforcement nanomaterial distributed therein that comprises an electrically conductive material; (14) the device is a strain-tunable plasma reactor that incorporates the polymeric structure having a kirigami patterned surface as a strain-tunable stretchable electrode; (15) the device is fuel device that incorporates the polymeric structure having a kirigami patterned surface as a stretchable electrode, where the polymeric structure may be a nanocomposite that comprises a polymer and a reinforcement nanomaterial distributed therein that comprises an electrically conductive material; (16) the device may a chiroptical device incorporating the polymeric structure. By using kirigami patterned out-of-plane features by twisting or stretching the polymeric structure, the present disclosure contemplates use of the polymeric structure as a chiroptical structure. The polymeric structure may be a nanocomposite that comprises a polymer and a reinforcement nanomaterial distributed therein; and/or (17) the device incorporating the polymeric structure may be selected from the group consisting of: a radio frequency plasma device, a surface treatment device, a materials processing device, a plasmonic device, a display device, a radar phase array, an electrode, a fuel cell electrode, a chiroptical structure, an ozone production device, a corona-induced airflow device, and a tunable optic device.

In yet other aspects, the present disclosure contemplates a tunable optic device comprising a tunable optic grating capable of transmitting light and/or reflecting light. The tunable optic grating comprises a stretchable polymeric structure having a patterned surface defining a first row of at least two discontinuous cuts and a second row of at least two discontinuous cuts offset from the first row. The first row and the second row cooperate to define a plurality of bridge structures therebetween. The tunable optic device further comprises a tensioning component attached to the tunable polymeric structure that reversibly stretches the stretchable polymeric structure in at least one direction, thereby modifying the light as it is transmitted through or reflected from the stretchable polymeric structure in the tunable optic grating. Also specifically disclosed are combinations including this tunable optic device comprising a tunable optic grating polymeric structure optionally with any one or any combination of more than one of the enumerated features (18)-(24).

The tunable optic device comprising a tunable optic grating may optionally have any one or any combination of more than one of the following features: (18) the device further comprises a source of light directed at the tunable optic grating; (19) the stretchable polymeric structure comprises a multilayered structure comprising at least one layer comprising a polymer; (20) the stretchable polymeric structure comprises a multilayered structure comprising at least one layer comprising a polymer selected from a Parylene C poly(p-xylylene) polymer having a substituted chlorine atom or group in each repeated unit; (21) the multilayered structure further comprises at least one metal layer; (22) the multilayered structure further comprises at least one metal layer comprising chromium (Cr); (23) the stretchable polymeric structure comprises at least one nanocomposite that comprises a polymer and a reinforcement nanomaterial distributed therein and the nanocomposite is stretchable in at least one direction; and/or (24) the stretchable polymeric structure comprises a multilayered structure comprising at least one layer comprising a first polymer comprising a Parylene C poly(p-xylylene) polymer having a substituted chlorine atom in each repeated unit and at least one second layer that is a nanocomposite comprising a polyvinyl alcohol (PVA) polymer and a reinforcement material comprising carbon nanotubes (CNT).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A structure comprising a nanocomposite having a patterned surface defining a first row of at least two discontinuous cuts and a second row of at least two discontinuous cuts offset from the first row, wherein the respective at least two discontinuous cuts of the first row and the second row are microscale cuts the first row and the second row cooperate to define a plurality of bridge structures therebetween, wherein the nanocomposite comprises a polymer and a reinforcement nanomaterial distributed therein and the nanocomposite is stretchable in at least one direction.

2. The structure of claim 1, wherein the microscale cuts respectively having a maximum length that is less than or equal to about 100 micrometers (μm).

3. The structure of claim 1, wherein the polymer comprises polyvinyl alcohol (PVA) and the reinforcement nanomaterial comprises a conductive nanoparticle selected from the group consisting of metals, graphene oxide, graphene, carbon nanotubes, nanowires, rods, seedling metals, and combinations thereof.

4. The structure of claim 1, wherein the first row and the second row define a plurality of linear structures, round structures, rectangular structures, or polygonal structures when in a stretched state.

5. The structure of claim 1, wherein the nanocomposite exhibits an ultimate tensile strain of greater than or equal to about 100%.

6. The structure of claim 1, wherein the nanocomposite exhibits an electrical conductivity of greater than or equal to about $1.5 \times 10^3$ S/cm when in a fully stretched position.

7. A tunable optic device comprising:
a tunable optic grating capable of transmitting light, wherein the tunable optic grating comprises a stretchable polymeric structure having a patterned surface defining a first row of at least two discontinuous cuts and a second row of at least two discontinuous cuts offset from the first row, wherein the first row and the second row cooperate to define a plurality of bridge structures therebetween; and
a tensioning component attached to the tunable optic grating that reversibly stretches the stretchable polymeric structure in at least one direction, thereby modifying the light as it is transmitted through the stretchable polymeric structure in the tunable optic grating.

8. The tunable optic device of claim 7, wherein the device further comprises a source of light directed at the tunable optic grating.

9. The tunable optic device of claim 7, wherein the stretchable polymeric structure comprises a multilayered structure comprising at least one layer comprising a polymer.

10. The tunable optic device of claim 9, wherein the polymer comprises Parylene C poly(p-xylylene) polymer having a substituted chlorine group per each repeated unit.

11. The tunable optic device of claim 9, wherein the multilayered structure further comprises at least one metal layer.

12. The tunable optic device of claim 11, wherein the at least one metal layer comprises chromium (Cr).

13. The tunable optic device of claim 7, wherein the stretchable polymeric structure comprises at least one nanocomposite that comprises a polymer and a reinforcement nanomaterial distributed therein and the nanocomposite is stretchable in at least one direction.

14. The tunable optic device of claim 7, wherein the stretchable polymeric structure comprises a multilayered structure having at least one layer comprising Parylene C poly(p-xylylene) polymer having a substituted chlorine group per each repeated unit and at least one second layer comprising a nanocomposite comprising polyvinyl alcohol (PVA) and a reinforcement material comprising carbon nanotubes (CNT).

15. A photolithographic method of making a nanocomposite having a kirigami patterned surface, the method comprising:
disposing the nanocomposite on a substrate, wherein the nanocomposite comprises a polymer and a reinforcement nanomaterial distributed therein;
applying a photoresist material to the nanocomposite and forming a pattern of openings in the photoresist material by exposing it to a source of light or energy; and
etching the nanocomposite through the openings in the photoresist material, wherein the etching creates a pattern in the nanocomposite defining a first row comprising at least two discontinuous cuts and a second row comprising at least two discontinuous cuts offset from the first row, wherein the respective at least two discontinuous cuts of the first row and the second row are microscale cuts and the first row and the second row cooperate to define a plurality of bridge structures therebetween, wherein the nanocomposite is stretchable in at least one direction.

16. The method of claim 15, wherein the disposing of the nanocomposite comprises forming the nanocomposite on the substrate via a process selected from vacuum assisted filtration (VAF) or layer-by-layer assembly (LBL).

17. The method of claim 15, wherein the respective at least two discontinuous cuts of the first row and the second row are microscale cuts and the etching comprises applying oxygen plasma to the photoresist material and the nanocomposite.

18. The method of claim 15, wherein the polymer comprises polyvinyl alcohol (PVA) and the reinforcement nanomaterial comprises a conductive nanoparticle selected from the group consisting of: metals, graphene oxide, graphene, carbon nanotubes, nanowires, rods, seedling metals, and combinations thereof.

19. The method of claim 15, wherein the first row and the second row define a plurality of linear structures, round structures, rectangular structures, or polygonal structures when in a stretched state.

20. The method of claim 15, wherein after the etching, the nanocomposite exhibits an ultimate tensile strain of greater than or equal to about 100% and an electrical conductivity of greater than or equal to about $1.5 \times 10^3$ S/cm when in a fully stretched position.

21. The tunable optic device of claim 7, wherein the respective at least two discontinuous cuts of the first row and the second row are microscale cuts respectively having a maximum length that is less than or equal to about 100 micrometers (μm).

22. The photolithographic method of claim 15, wherein the microscale cuts respectively having a maximum length that is less than or equal to about 100 micrometers (μm).

* * * * *